US010181190B2

(12) United States Patent
Ryu

(10) Patent No.: US 10,181,190 B2
(45) Date of Patent: Jan. 15, 2019

(54) MICROSCOPE AND MICROSCOPE IMAGE ACQUISITION METHOD

(71) Applicant: OLYMPUS CORPORATION, Shibuya-ku, Tokyo (JP)

(72) Inventor: Go Ryu, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 271 days.

(21) Appl. No.: 14/922,757

(22) Filed: Oct. 26, 2015

(65) Prior Publication Data

US 2016/0124203 A1    May 5, 2016

(30) Foreign Application Priority Data

Nov. 4, 2014   (JP) .................................. 2014-224086
Nov. 4, 2014   (JP) .................................. 2014-224087
Nov. 4, 2014   (JP) .................................. 2014-224088

(51) Int. Cl.
*G06T 7/38*      (2017.01)
*G06T 7/00*      (2017.01)
(Continued)

(52) U.S. Cl.
CPC ............ *G06T 7/0038* (2013.01); *G02B 21/06* (2013.01); *G02B 21/16* (2013.01); *G02B 21/367* (2013.01);
(Continued)

(58) Field of Classification Search
CPC ...... G02B 21/06; G02B 21/16; G02B 21/367; G06T 7/0038
See application file for complete search history.

(56) References Cited

U.S. PATENT DOCUMENTS 7,554,725 B2   6/2009   Stelzer et al.
7,787,179 B2   8/2010   Lippert et al.
(Continued)

FOREIGN PATENT DOCUMENTS

EP      1953579 A1      8/2008
JP      2008216996 A    9/2008
(Continued)

OTHER PUBLICATIONS

Japanese Office Action dated Feb. 20, 2018 issued in counterpart Japanese Application No. 2014-224086.
(Continued)

*Primary Examiner* — Neil R Mikeska
(74) *Attorney, Agent, or Firm* — Holtz, Holtz & Volek PC

(57) ABSTRACT

To prevent unwanted exposure of a specimen with excitation light despite magnification switching, a microscope of the present invention includes: a detection optical system that detects fluorescence emitted from the specimen; a light-sheet illumination optical system, serving as an excitation light source, that causes planar excitation light to be incident along a direction intersecting an optical axis of the detection optical system; and a control section that, when the magnification of the detection optical system is raised, controls the light-sheet illumination optical system so as to reduce a radiation width of the excitation light made incident on the specimen by the light-sheet illumination optical system.

9 Claims, 23 Drawing Sheets

(51) Int. Cl.
*G02B 21/36* (2006.01)
*G02B 21/06* (2006.01)
*G02B 21/16* (2006.01)
*G02B 21/00* (2006.01)
*G02B 26/10* (2006.01)

(52) U.S. Cl.
CPC ........ *G02B 21/0048* (2013.01); *G02B 26/105* (2013.01)

(56) References Cited

U.S. PATENT DOCUMENTS

| | | | | |
|---|---|---|---|---|
| 8,441,633 | B2* | 5/2013 | Truong | G01N 21/6408 250/458.1 |
| 8,792,162 | B2* | 7/2014 | Lippert | G02B 21/0032 359/385 |
| 8,970,950 | B2 | 3/2015 | Stelzer | |
| 2006/0197034 | A1* | 9/2006 | Shirai | G01N 21/6428 250/458.1 |
| 2007/0035855 | A1* | 2/2007 | Dickensheets | A61B 5/0068 359/819 |
| 2007/0154938 | A1* | 7/2007 | Oshida | G01N 21/6428 435/6.11 |
| 2008/0185533 | A1 | 8/2008 | Kimura et al. | |
| 2009/0225413 | A1 | 9/2009 | Stelzer et al. | |
| 2009/0237765 | A1 | 9/2009 | Lippert et al. | |
| 2010/0111768 | A1* | 5/2010 | Banerjee | C12Q 1/6869 422/82.08 |
| 2011/0115895 | A1 | 5/2011 | Huisken | |
| 2012/0098949 | A1 | 4/2012 | Knebel et al. | |
| 2012/0099190 | A1 | 4/2012 | Knebel et al. | |
| 2012/0200693 | A1* | 8/2012 | Lippert | G02B 21/002 348/79 |
| 2014/0042339 | A1 | 2/2014 | Stelzer et al. | |
| 2015/0323774 | A1 | 11/2015 | Lippert et al. | |
| 2015/0338628 | A1 | 11/2015 | Knebel et al. | |
| 2016/0139394 | A1 | 5/2016 | Taniguchi et al. | |

FOREIGN PATENT DOCUMENTS

| | | |
|---|---|---|
| JP | 2008250303 A | 10/2008 |
| JP | 2012108491 A | 6/2012 |
| JP | 2013506150 A | 2/2013 |
| JP | 5259916 B2 | 8/2013 |
| JP | 5525136 B2 | 6/2014 |
| JP | 2014202967 A | 10/2014 |
| WO | 2011120629 A1 | 10/2011 |

OTHER PUBLICATIONS

Japanese Office Action dated Mar. 20, 2018 issued in counterpart Japanese Application No. 2014-224087.
Japanese Office Action dated Apr. 3, 2018 issued in counterpart Japanese Application No. 2014-224088.

* cited by examiner

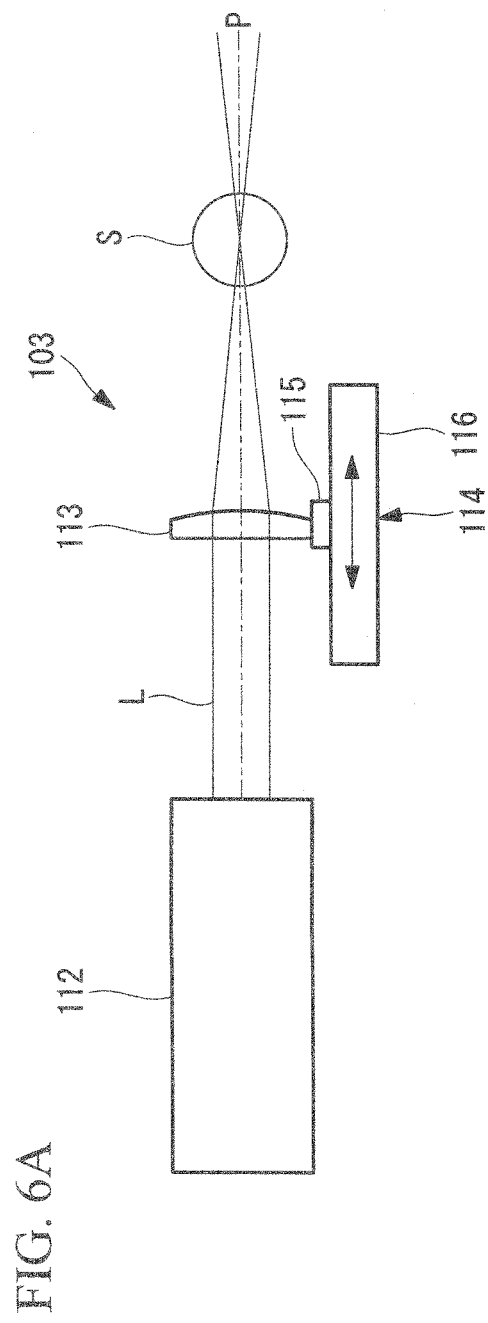
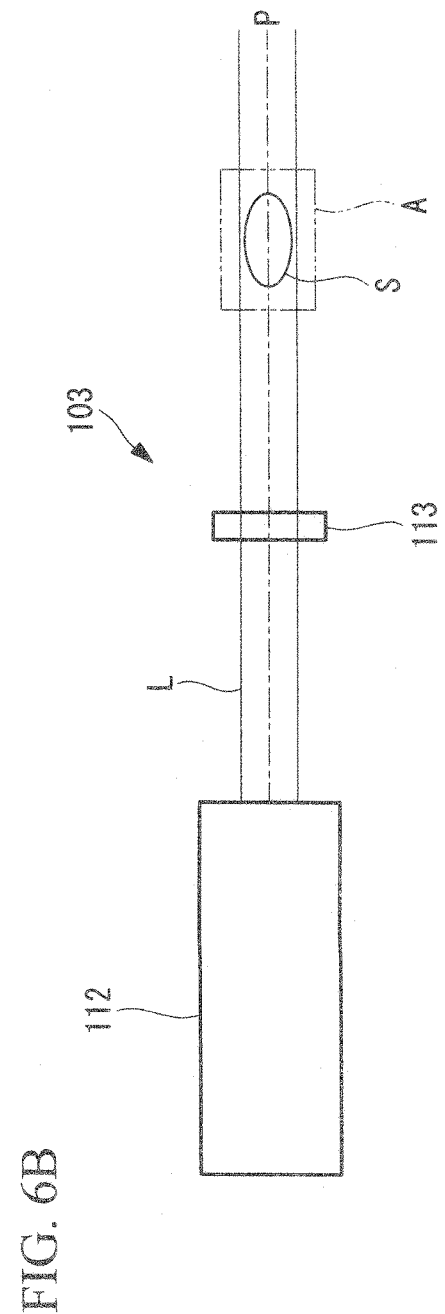
FIG. 6A
FIG. 6B

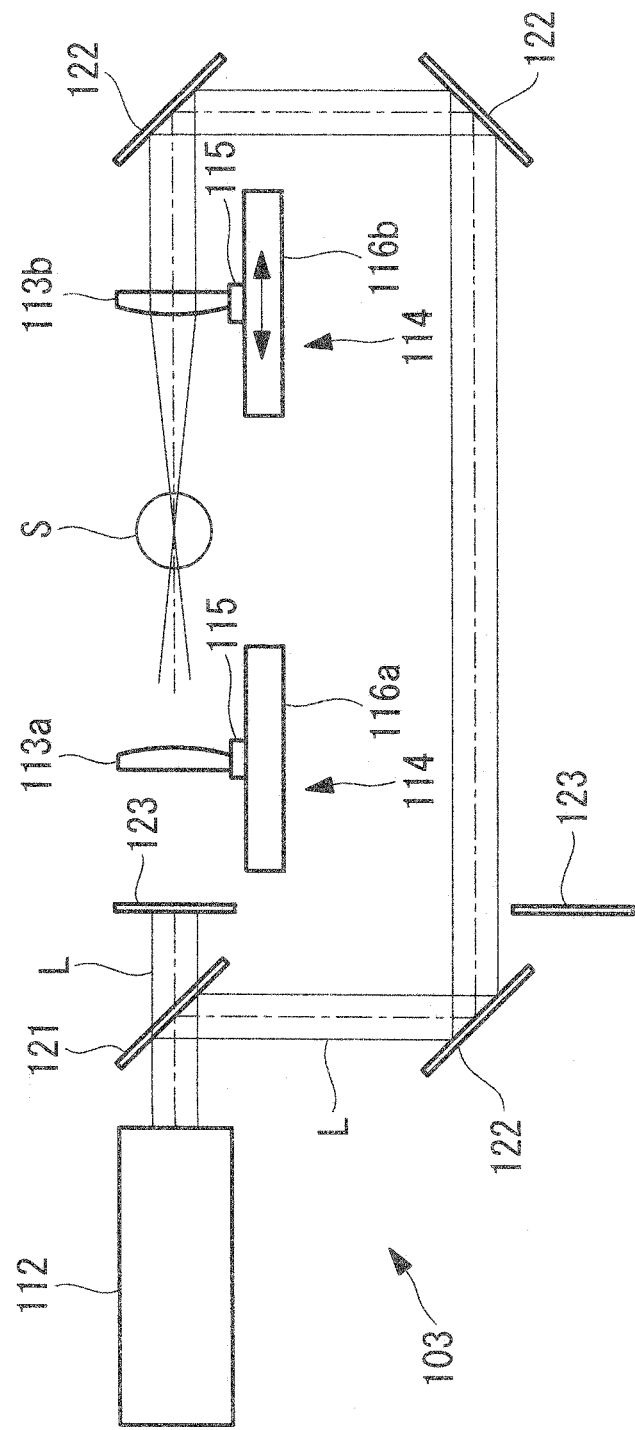

FOCAL POSITION

MICROSCOPE AND MICROSCOPE IMAGE ACQUISITION METHOD

CROSS-REFERENCE TO RELATED APPLICATIONS

This application is based on Japanese Patent Applications Nos. 2014-224086, 2014-224087, and 2014-224088 the contents of which are incorporated herein by reference.

TECHNICAL FIELD

The present invention relates to microscopes and microscope image acquisition methods.

BACKGROUND ART

There are known microscopes based on the light-sheet illumination technique that allows excitation light to be incident on a specimen along a plane orthogonal to the optical axis of the detection optical system for detecting fluorescence from the specimen (e.g., refer to Patent Literature 1 below). According to the epi-illumination technique or the transillumination technique, two-dimensional images suffering less blurring in the optical-axis direction are acquired by two-dimensionally scanning excitation light focused on a single point or a plurality of points using a confocal optical system. On the other hand, according to the light-sheet illumination technique, the time required to acquire an image can be reduced because just the plane corresponding to the focal plane being observed needs to be illuminated in the optical-axis direction of the detection optical system whereas a wide area can be illuminated all at once in a direction orthogonal to the optical axis of the detection optical system.

Furthermore, there are also known microscopes based on the light-sheet illumination technique that allows planar excitation light beams with different wavelengths to be simultaneously incident on a specimen from two opposite directions of the specimen along a plane orthogonal to the optical axis of the detection optical system for detecting fluorescence from the specimen (e.g., refer to Patent Literature 2 below). The microscope described in Patent Literature 2 allows excitation light beams with different wavelengths to be simultaneously incident on the same region of the same specimen from opposite directions. Because fluorescences generated in response to the excitation light beams have different wavelengths from one another, two or more fluorescence images can be acquired at a time using the same detection optical system and can be separated, that is, classified by wavelength.

CITATION LIST

Patent Literature

{PTL 1}
Publication of Japanese Patent No. 5259916,
{PTL 2}
PCT International Publication No. WO 2011/120629

SUMMARY OF INVENTION

Technical Problem

The present invention has been conceived in light of the above-described circumstances and provides a microscope capable of preventing unwanted exposure of a specimen with excitation light even if the magnification is switched.

The present invention also provides a microscope and a microscope image acquisition method capable of acquiring clear images of a specimen over a wide area, even in a case where a sufficient depth of focus cannot be secured.

Furthermore, the present invention provides a microscope and a microscope image acquisition method based on the light-sheet illumination technique that can acquire images at high speed even if excitation light beams having the same wavelength or overlapping wavelengths are radiated on neighboring or overlapping regions in the same specimen by switching between different directions of the excitation light beams to acquire clear fluorescence images.

Solution to Problem

One aspect of the present invention is a microscope including: a detection optical system that detects fluorescence emitted from a specimen; a light-sheet illumination optical system that causes planar excitation light to be incident along a direction intersecting an optical axis of the detection optical system; and a control section that, when a magnification of the detection optical system is raised, controls the light-sheet illumination optical system so as to reduce a radiation width of the excitation light that is incident on the specimen from the light-sheet illumination optical system.

Another aspect of the present invention is a microscope including: a detection optical system that detects fluorescence emitted from a specimen to acquire a fluorescence image; a light-sheet illumination optical system that causes planar excitation light to be incident along a direction intersecting an optical axis of the detection optical system; and an image processing section that processes the image acquired by the detection optical system, wherein the light-sheet illumination optical system moves a focal position of the excitation light along an incidence direction thereof, and the image processing section combines a plurality of the fluorescence images that are acquired by the detection optical system each time the excitation light is made incident on a different focal position by the light-sheet illumination optical system, thereby generating a composite image.

Still another aspect of the present invention is a microscope including: a detection optical system that detects fluorescence emitted from a specimen to acquire a fluorescence image; a light-sheet illumination optical system that alternately switches an incidence direction between two or more different directions from outside the specimen to sequentially cause planar excitation light to be incident along a plane intersecting an optical axis of the detection optical system; and an image processing section that combines a plurality of the fluorescence images acquired by the detection optical system when the excitation light is incident along a different incidence direction, wherein the light-sheet illumination optical system switches an incidence direction of the excitation light in such an order that the excitation light is made incident starting from a direction equal to an identical incidence direction between before and after combining processing by the image processing section.

BRIEF DESCRIPTION OF DRAWINGS

FIG. 6A is a side elevational view of the light source unit of the microscope in FIG. 5.

FIG. 6B is a plan view of the light source unit of the microscope in FIG. 5.

FIG. 10B shows a modification of the light source unit in FIG. 6A in the form of a side elevational view as seen when excitation light is incident on the specimen from another direction.

DESCRIPTION OF EMBODIMENTS

A microscope 1 according to a first embodiment of the present invention will now be described with reference to the drawings.

Figure 1:
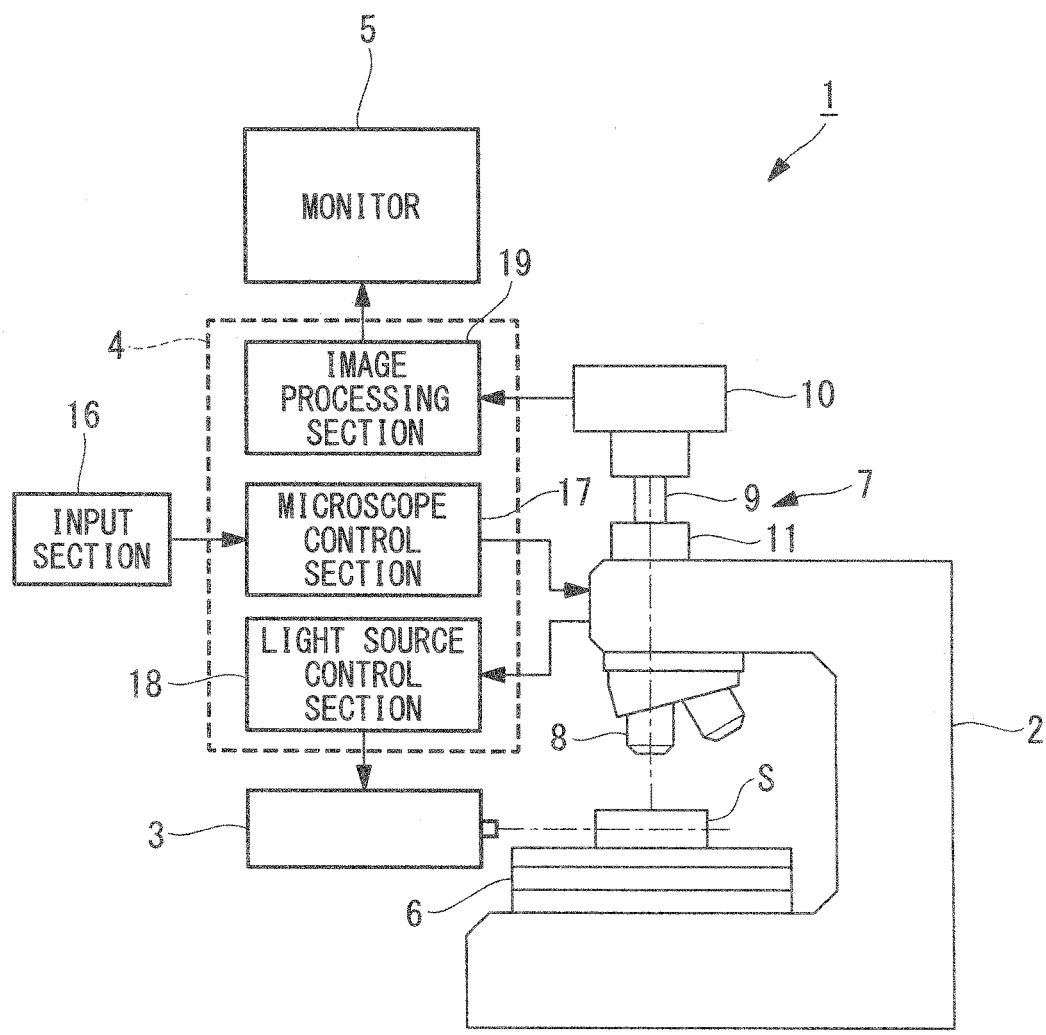
FIG. 1 is an overall schematic diagram showing a microscope according to a first embodiment of the present invention.

Referring to FIG. 1, the microscope 1 according to this embodiment includes a microscope main body 2, a light source unit (light-sheet illumination optical system) 3 connected to the microscope main body 2, and a control section 4 for controlling the light source unit 3 and the microscope main body 2. A monitor 5 for displaying images acquired by the microscope main body 2 is connected to the control section 4.

The microscope main body 2 includes a stage 6 on which a specimen S is placed and a detection optical system 7 for detecting fluorescence emitted from the specimen S placed on the stage 6. The detection optical system 7 includes an objective lens 8 disposed above the specimen S placed on the stage 6 so as to face the specimen S along the vertical line passing through the specimen S, an image-forming lens 9 for forming a fluorescence image from the specimen S collected by the objective lens 8, and an imaging device 10 for acquiring an image of fluorescence formed by the image-forming lens 9. In the figure, a filter wheel 11 includes a barrier filter for eliminating excitation light contained in the fluorescence.

Figure 2:
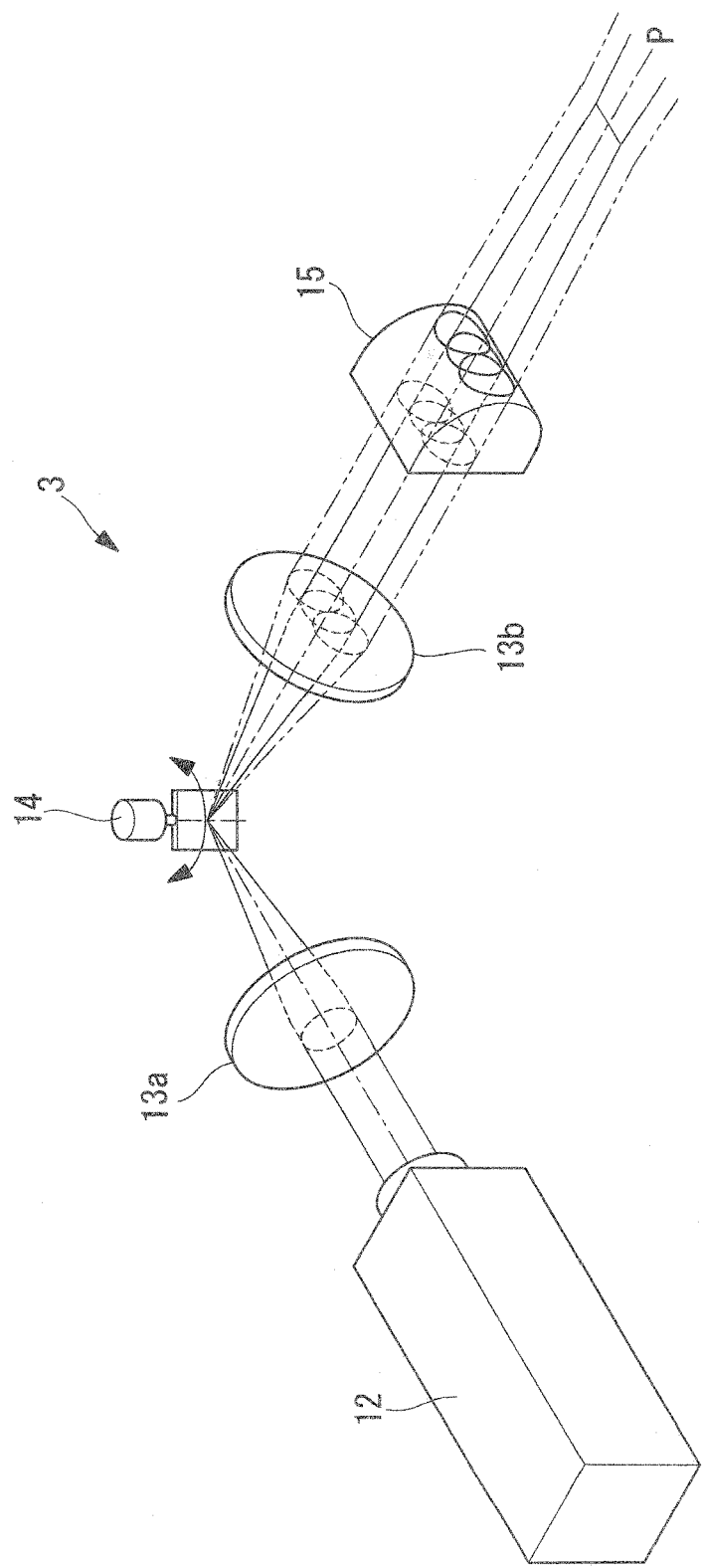
FIG. 2 is a perspective view showing a light source unit of the microscope in FIG. 1.
Figure 3:
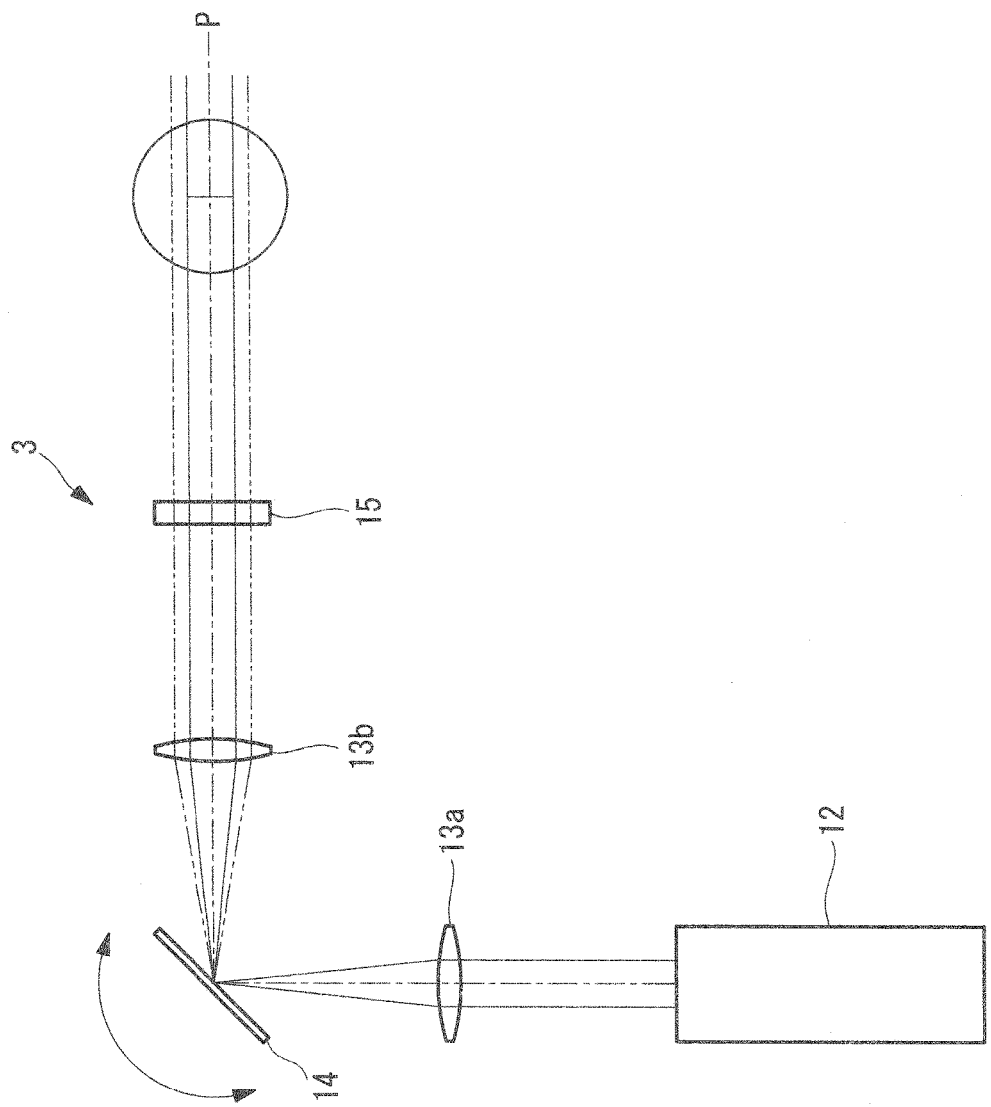
FIG. 3 is a plan view of the light source unit in FIG. 2.

As shown in FIGS. 2 and 3, the light source unit 3 includes an excitation light source 12 for emitting excitation light in the form of substantially collimated light; a pair of relay lenses 13a and 13b that converge the excitation light from the excitation light source 12 to form an intermediate image of the excitation light at a position optically conjugate with the position of e specimen S; a galvanometer mirror (scanning section) 14 that is disposed at the position of the intermediate image of the excitation light formed via the relay lens 13a to deflect the excitation light; and a cylindrical lens (excitation-light-forming optical system) 15 that converges into a line the excitation light that has been transformed into substantially collimated light via the relay lens 13b.

The cylindrical lens 15 is provided with power in one direction orthogonal to an optical axis P and converges the excitation light in the form of substantially collimated light into a substantially planar shape of a predetermined width equal to the diameter of that excitation light beam.

The galvanometer mirror 14 is provided so as to be capable of swiveling in one direction and, when swiveled, causes the excitation light to move in the width direction thereof.

Referring back to FIG. 1, the control section 4 includes a microscope control section 17 for controlling the magnification of the objective lens 8 and the magnification of the image-forming lens 9 and a light source control section 18 for controlling the light source unit 3. The control section 4 is composed of a computer that includes an arithmetic processing unit and a memory to implement operations of an image processing section 19 described later, as well as operations of the microscope control section 17 and the light source control section 18 (e.g., image generation; processing of instructions input from an input section 16 and an operating section, which is not shown in the figure; control of various electrically driven parts, such as the stage 6, a lens switch or a zoom mechanism, the filter wheel 11, and the galvanometer mirror 14, and display by the monitor 5; and storage of various parameters). This computer is also responsible for storage of a sensor size and calculation of the swivel angle of the galvanometer mirror 14.

Furthermore, the microscope control section 17 and the light source control section 18 include a control board for driving various electrically driven parts on the basis of a control signal from the computer.

The light source control section 18 stores the sensor size of the imaging device 10. Moreover, the input section 16 for inputting the magnification of the selected objective lens 8 and the magnification of the image-forming lens 9 is connected to the microscope control section 17.

The light source control section 18 calculates the swivel angle of the galvanometer mirror 14 on the basis of the magnification of the objective lens 8 and the magnification of the image-forming lens 9 that have been input thereto from the input section 16 and set in the microscope main body 2, thereby controlling the light source unit 3.

For the sensor size of the imaging device 10, the width along the direction orthogonal to the incident light axis is stored. For example, if excitation light is incident on a laterally elongated field of view from the lateral direction, the longitudinal width of the imaging device 10 is stored as the sensor size.

In this case, the swivel angle of the galvanometer mirror 14 is calculated using the following Expression (1).

$$\alpha = \tan^{-1}(c/(a \times b)/2/f)/2 \quad (1)$$

where
- $\alpha$ is the unilateral swivel angle of the galvanometer mirror 14,
- a is the magnification of the objective lens 8,
- b is the magnification of the image-forming lens 9,
- c is the longitudinal width of the sensor of the imaging device 10, and
- f is the focal length of the relay lens 13b.

Furthermore, the control section 4 carries out control of the microscope main body 2, including movement of the specimen S via the operation of the stage 6 in response to an input from the operating section, replacement or magnification adjustment of the objective lens 8 or the image-forming lens 9 through the microscope control section 17, and replacement of the filter via the operation of the filter wheel 11.

In addition, the control section 4 includes the image processing section 19, which processes image signals acquired by the imaging device 10 and generates images to be displayed on the monitor 5.

The operation of the microscope 1 according to this embodiment with the above-described structure will now be described.

To observe the specimen S using the microscope 1 according to this embodiment, the specimen S is placed on the stage 6, which is then moved to set the specimen S at the focal position of the objective lens 8. Thereafter, the magnification of the objective lens 8 and the magnification of the image-forming lens 9 are input from the input section 16 into the microscope control section 17. By doing so, the magnification of the objective lens 8 and the magnification of the image-forming lens 9 are set in the microscope main body 2.

In the light source control section 18, the swivel angle of the galvanometer mirror 14 is calculated according to Expression (1), on the basis of the stored sensor size, as well as the magnification of the objective lens 8 and the magnification of the image-forming lens 9 that have been input from the input section 16 and set in the microscope main body 2, and on the basis of this calculated swivel angle, the galvanometer mirror 14 is controlled.

Excitation light in the form of substantially collimated light emitted from the excitation light source 12 is converged by the relay lens 13a, is deflected by the galvanometer mirror 14 disposed at that converged point, and is then restored to substantially collimated light by the relay lens 13b. Thereafter, the excitation light is converged into a line via the cylindrical lens 15. With a sufficiently large focal length of this cylindrical lens 15, the excitation light, when radiated onto the specimen S, takes a zonal (planar) shape having a predetermined width at or near the focal position.

When the galvanometer mirror 14 is swiveled, the zonal excitation light moves in the width direction thereof, and therefore, the zonal excitation light can be radiated to cover a range in accordance with the swivel angle of the galvanometer mirror 14. More specifically, by causing the zonal excitation light from the light source unit 3 to be incident along the focal plane of the detection optical system 7, fluorescence can be produced only in a thin region along the focal plane, thereby allowing a clear fluorescence image along the focal plane to be acquired using the detection optical system 7.

In this case, the swivel angle of the galvanometer mirror 14 in the microscope 1 of this embodiment is set using Expression (1), and as the magnification of the objective lens 8 and the magnification of the image-forming lens 9 (the product of the two magnifications is equal to the magnification of the detection optical system 7) become larger, the field of view to be imaged by the imaging device 10 becomes narrower, allowing the swivel angle of the galvanometer mirror 14 to become correspondingly smaller.

In other words, according to Expression (1), the galvanometer mirror 14 is swiveled so that the widthwise center of the zonal excitation light scans only the field of view in the specimen S required for the entire effective light-reception range of the imaging device 10 to receive a fluorescence signal. By doing so, it is possible to prevent unwanted exposure of regions outside the field of view in the specimen S with excitation light. Consequently, an advantage is afforded in that even if the magnification of the detection optical system 7 is switched, the specimen S can be prevented from deteriorating or fading due to exposure with excitation light.

Figure 4:
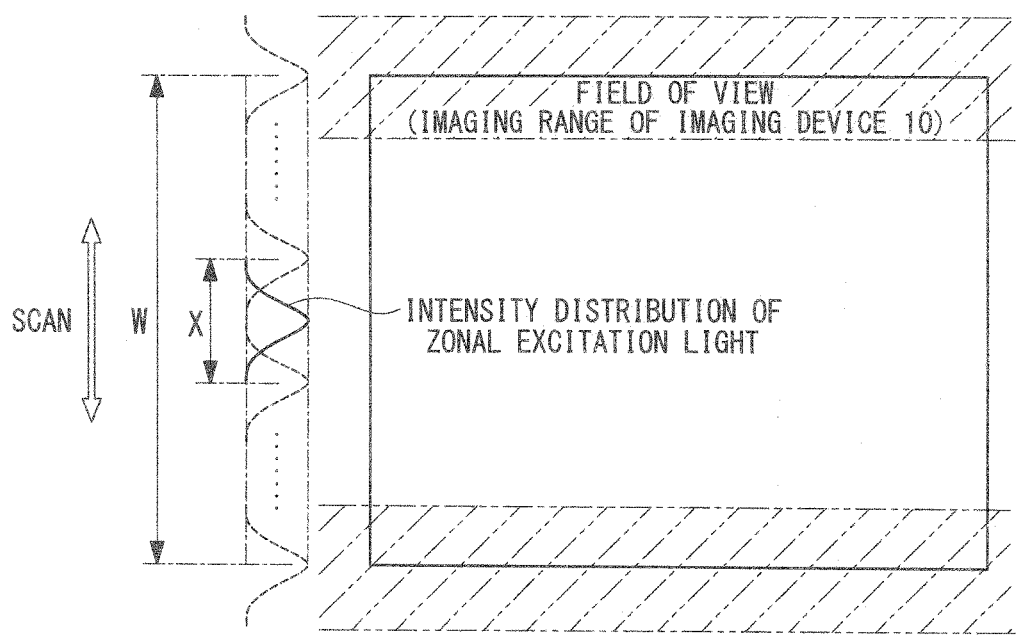
FIG. 4 is a conceptual diagram showing an intensity distribution of excitation light emitted from the light source unit in FIG. 1 when the excitation light scans the field of view.

Here, as shown in FIG. 4, because the swivel angle is set so that the widthwise center of the zonal excitation light scans the field of view W, the range actually exposed to excitation light becomes larger than the field of view W by a width X of the excitation light. However, because the intensity of the zonal excitation light decreases away from the center along the width direction, swiveling the galvanometer mirror 14 so as to satisfy Expression (1) can prevent a fluorescence image from becoming dark in peripheral areas thereof.

Scanning of zonal excitation light using the galvanometer mirror 14 may be repeated two or more times during one imaging exposure.

Although this embodiment has been described by way of an example where the galvanometer mirror 14 is employed as the scanning section, it is not limited to this. Instead, any type of scanning unit, such as an acousto-optic device or a polygon mirror, may be employed as the scanning section.

Furthermore, this embodiment has been described by way an example where the objective lens 8, the image-forming lens 9, and the filter wheel 11 are driven by the control section 4, but these components may be driven manually. In addition, this embodiment has been described by way of an example where the magnifications are input using the input section 16, but a sensor for reading out information about the selected objective lens 8 or a sensor for reading out the magnification of the image-forming lens 9 may be provided to calculate the swivel angle of the galvanometer mirror 14 on the basis of that read-out magnification.

Furthermore, this embodiment has been described by way of an example where the swivel angle of the galvanometer mirror 14 is calculated on the basis of Expression (1), but a unilateral swivel angle α corresponding to the setting of each parameter may be pre-stored in the memory of the computer as a reference table, thereby allowing the corresponding unilateral swivel angle α to be read out from this reference table at the time of image acquisition.

A microscope 101 according to a second embodiment of the present invention will now be described with reference to the drawings.

The reference numbers and symbols in this embodiment described below refer to the same components as those having the same reference numbers and symbols in the microscope 1 of the first embodiment, and repeated descriptions of the same components are omitted.

The microscope 101 of this embodiment differs from the microscope 1 of the first embodiment in that an input section 117 is connected to a light source control section 118, and in the structure of a light source unit 103.

Referring to FIGS. 6A and 6B, the light source unit 103 includes an excitation light source 112 that emits excitation light L in the form of substantially collimated light; a cylindrical lens (excitation-light-forming optical system) 113 that converges into a line the excitation light L in the form of substantially collimated light emitted from the excitation light source 112; and a movement mechanism 114 that moves the cylindrical lens 113 along an incident light axis P thereof. In the figure, reference symbol A denotes the field of view of the detection optical system 7.

The cylindrical lens 113 is provided with power in one direction orthogonal to the optical axis P and converges the excitation light L in the form of substantially collimated light into a line of a predetermined width equal to the diameter of that excitation light beam.

The optical axis P of the excitation light L converged by the cylindrical lens 113 extends along a direction orthogonal to the optical axis of the detection optical system 7. Because of this, a range twice as large as the depth of focus, which is dependent on the numerical aperture of the excitation light L converged by the cylindrical lens 113, is irradiated with substantially planar excitation light (light-sheet illumination) L incident on the specimen S along the focal plane of the detection optical system 7, thereby allowing fluorescence to occur over a wide area of the focal plane in the specimen S all at once.

In the example shown in FIG. 6A, the movement mechanism 114 includes a slider 115 that supports the cylindrical lens 113; a linear guide 116 that movably guides the slider 115 along the direction of the incident light axis P of the excitation light L; and a motor, which is not shown in the figure, that linearly drives the slider 115 along the linear guide 116.

This motor is controlled by a control section 104 to move the position of the cylindrical lens 113.

Figure 5:
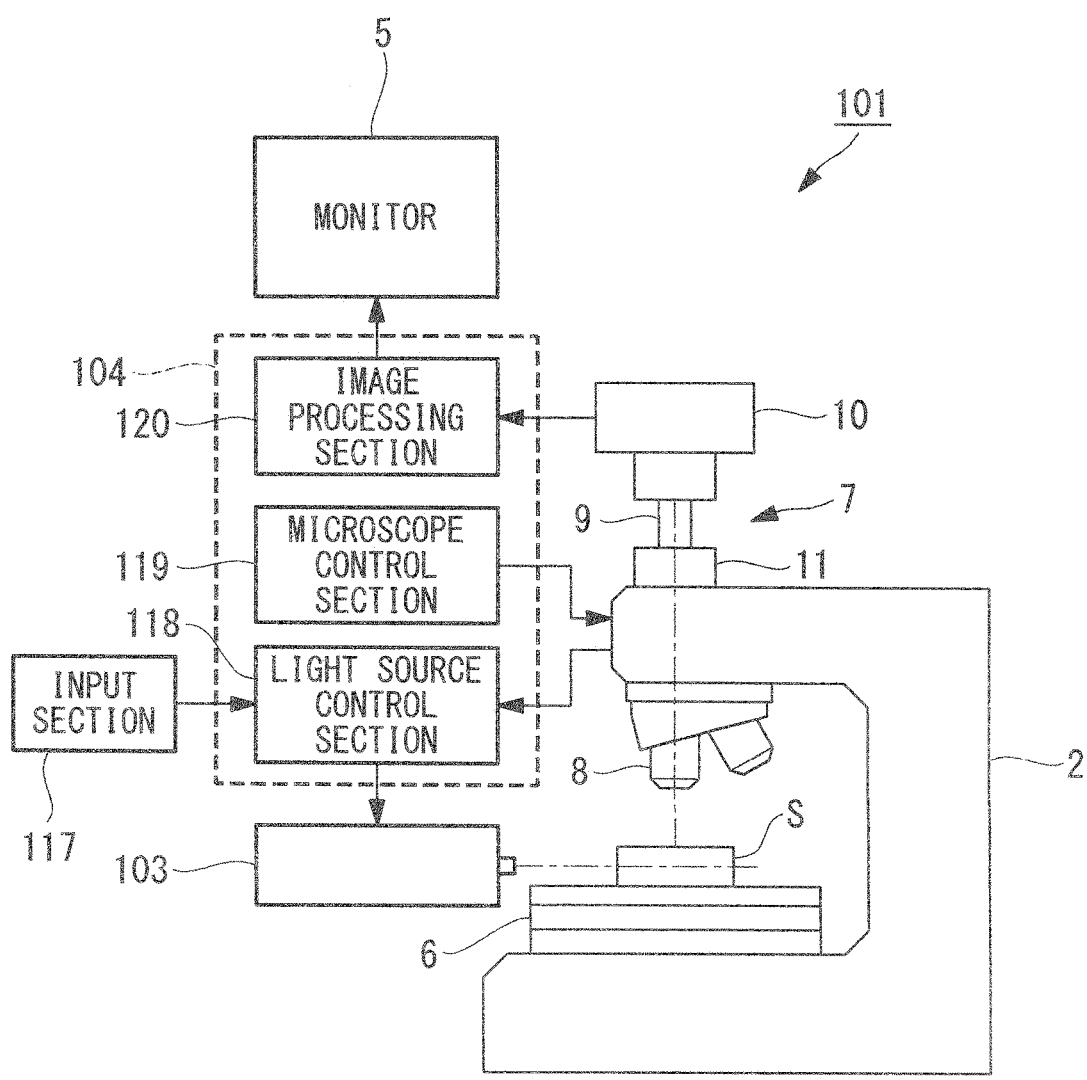
FIG. 5 is an overall schematic diagram showing a microscope according to a second embodiment of the present invention.

More specifically, the input section 117 is connected to the control section 104 to allow the movement start position, the number of movement steps, and the displacement of each movement step to be set for the cylindrical lens 113. As shown in FIG. 5, the control section 104 includes the light source control section 118 that controls the light source unit 103 on the basis of information, such as the movement start position, input from the input section 117.

The displacement of each movement step input from the input section 117 is set to, for example, 2Z, which is twice as large as the depth of focus Z.

$$Z = \lambda / NA^2$$

where λ is the wavelength of the excitation light L, and NA is the numerical aperture.

Figure 7A:
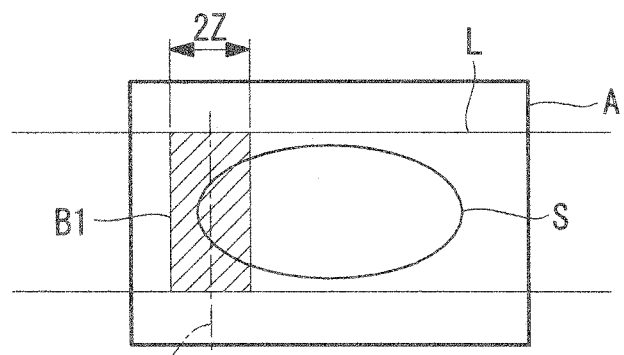
FIGS. 7A through 7D are diagrams respectively showing the depths of focus in a specimen when the focal position of excitation light from the light source unit in FIG. 6A is moved sequentially.
Figure 7B:
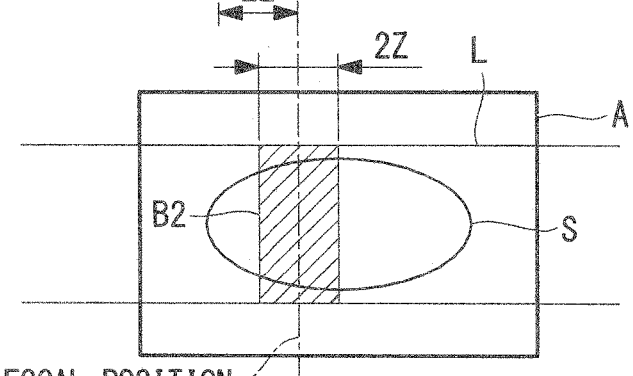
Figure 7C:
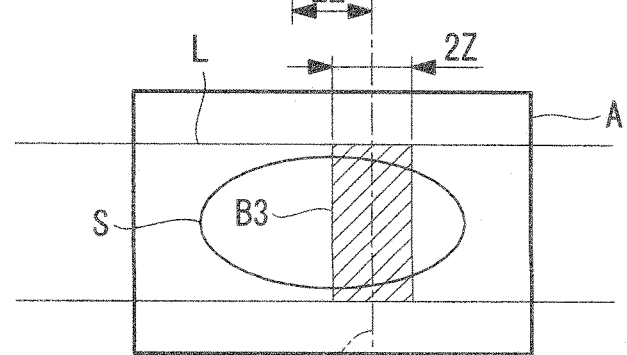
Figure 7D:
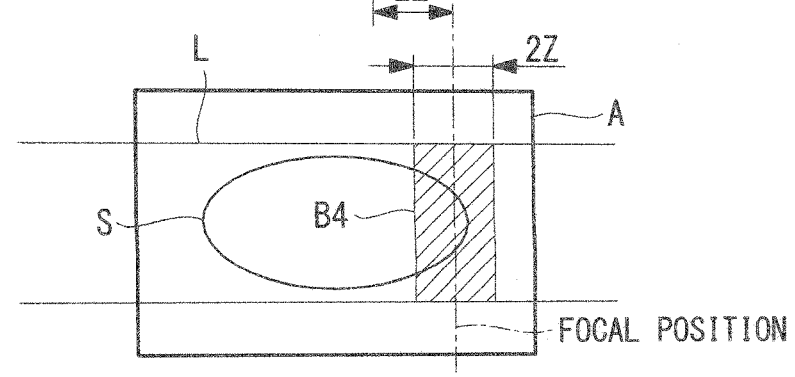

After moving the cylindrical lens 113 to the movement start position that has been set, as shown in FIG. 7A, the light source control section 118 causes the detection optical system 7 to carry out detection while repeating the operation of moving the cylindrical lens 113 by the set displacement 2Z the same number of times as the set number of movement steps (three times in the example of FIGS. 7A through 7D), as shown in FIGS. 7B through 7D.

Furthermore, the control section 104 includes a microscope control section 119 that carries out control of the microscope main body 2, including movement of the specimen S through the operation of the stage 6 in response to an input from the operating section, which is not shown in the figure, replacement or magnification adjustment of the objective lens 8 or the image-forming lens 9, and replacement of the filter through the operation of the filter wheel 11.

The control section 104 also includes an image processing section 120 that processes an image signal acquired with the imaging device 10 and generates an image to be displayed on the monitor 5.

Figure 9:
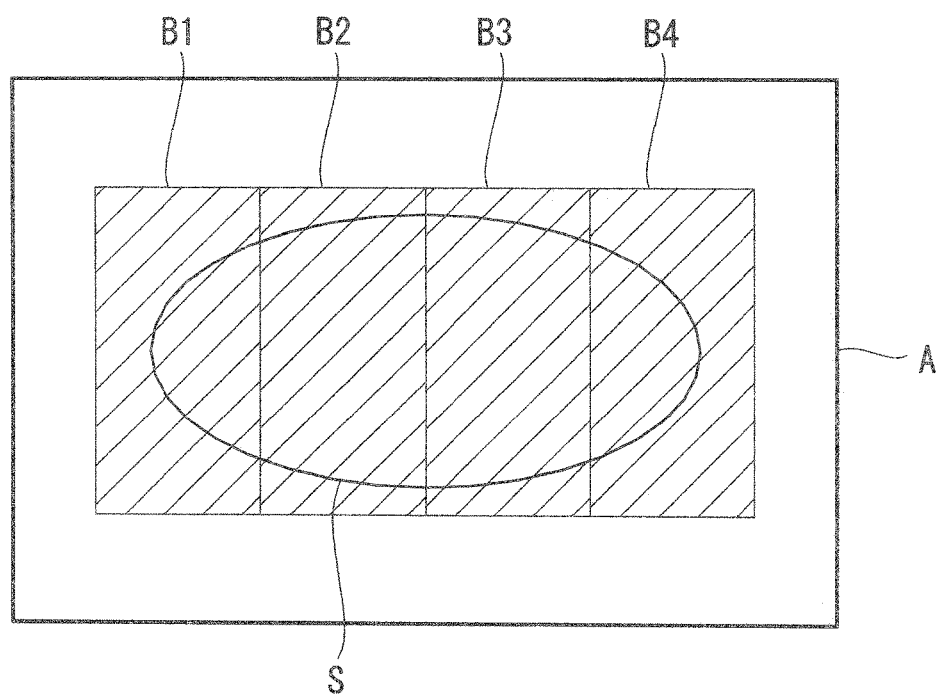
FIG. 9 is a diagram depicting a composite image produced as a result of combining fluorescence images acquired at the focal positions in FIG. 7.

Referring to FIG. 9, the image processing section 120 combines the fluorescence images that have been acquired using the detection optical system 7 when the excitation light L is made incident from the light source unit 103 with different focal positions in the direction of the incident light axis P for each movement step, thus generating a composite image.

More specifically, in combining a plurality of acquired fluorescence images, the image processing section 120 compares luminance values or contrast values of the corresponding pixels in the fluorescence images and selects a pixel having the maximum luminance value or the maximum contrast value.

Furthermore, the control section 104 is composed of a computer that includes an arithmetic processing unit and a memory to implement operations of the image processing section 120, as well as operations of the microscope control section 119, and the light source control section 118 (e.g., image generation; processing of instructions input from the input section 117 and the operating section; control of various electrically driven parts, such as the stage 6, a lens switch or a zoom mechanism, the filter wheel 11, and the movement mechanism 114, and display by the monitor 5; and storage of various parameters).

In addition, the microscope control section 119 and the light source control section 118 include a control board that drives various electrically driven parts on the basis of a control signal from the computer.

A microscope image acquisition method using the microscope 101 according to this embodiment with the above-described structure will now be described.

Figure 8:
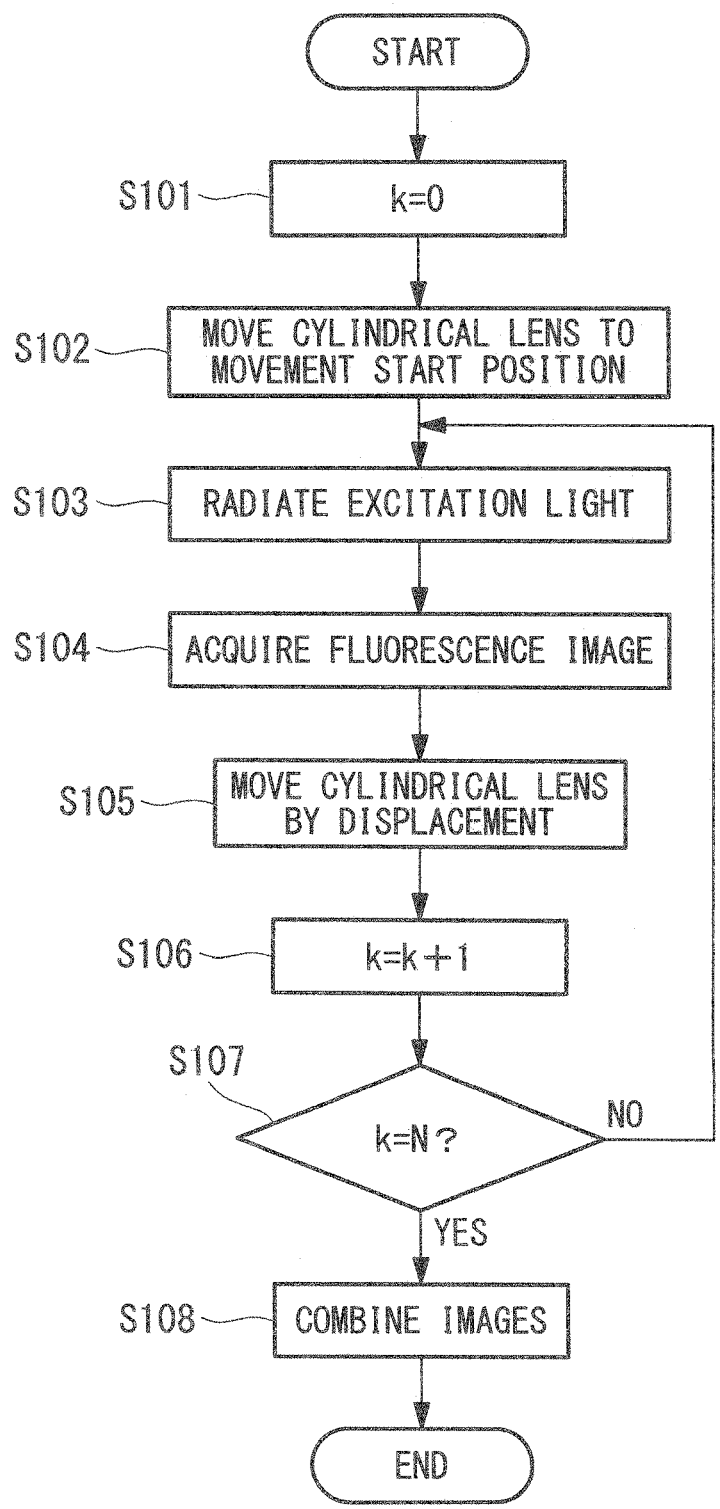
FIG. 8 is a diagram depicting a flowchart of a microscope image acquisition method according to the second embodiment of the present invention.

Referring to FIG. 8, according to the microscope image acquisition method of this embodiment, first a counter k is initialized (step S101), and the control section 104 moves the slider 115 by driving the motor so as to move the cylindrical lens 113 to the movement start position set via the input section 117 (step S102).

Next, the control section 104 causes the excitation light L to be radiated from the light source unit 103. The excitation light L is converged via the cylindrical lens 113 and, as shown in FIG. 7A, comes to a linear focus at a predetermined position in the specimen S (step S103). In this state, the control section 104 operates the detection optical system 7 and causes the imaging device 10 to capture fluorescence from the specimen S collected via the objective lens 8 and the image-forming lens 9, thus acquiring a fluorescence image (step S104).

Then, the control section 104 drives the motor on the basis of the displacement set by the input section 117 to move the cylindrical lens 113 (step S105). By doing so, the focal position of the cylindrical lens 113 moves by a distance equal to the amount of the displacement. Thereafter, the counter k is incremented (step S106), and if the counter k differs from the set number N of moving steps, steps S103 through S105 are repeated the same number of times as the number N of moving steps set via the input section 117, thus acquiring a plurality of fluorescence images with different focal positions of the excitation light L (step S107).

Subsequently, when the counter k becomes equal to the set number N of moving steps, the plurality of acquired zonal fluorescence images are combined to generate one composite image (step S108).

For acquired fluorescence images, the contrast is high in the band-shaped regions (hatched regions B1 through B4 in FIG. 7A through FIG. 7D), each of which is equivalent to an area twice as large as the depth of focus with respect to the focal position, whereas the contrast is low in other regions. For this reason, in step S108, the contrast values, for example, of corresponding pixels in the acquired fluorescence images are compared, and the luminance value of the pixel with the maximum contrast value is selected. In this manner, an accurately focused, clear composite image can be generated over the entire field of view, as shown in FIG. 9.

In other words, with the microscope 101 and the microscope image acquisition method according to this embodiment, an advantage is afforded in that a clear image of the specimen S can easily be acquired over a wide range even in a case where a sufficiently large depth of focus of light-sheet illumination cannot be secured.

In this embodiment, the image processing section 120 generates a composite image by selecting the luminance value of the pixel that gives the maximum contrast value from among the corresponding pixels. Instead of this, the luminance value of the pixel that gives the maximum luminance value from among the corresponding pixels may be selected.

Figure 10A:
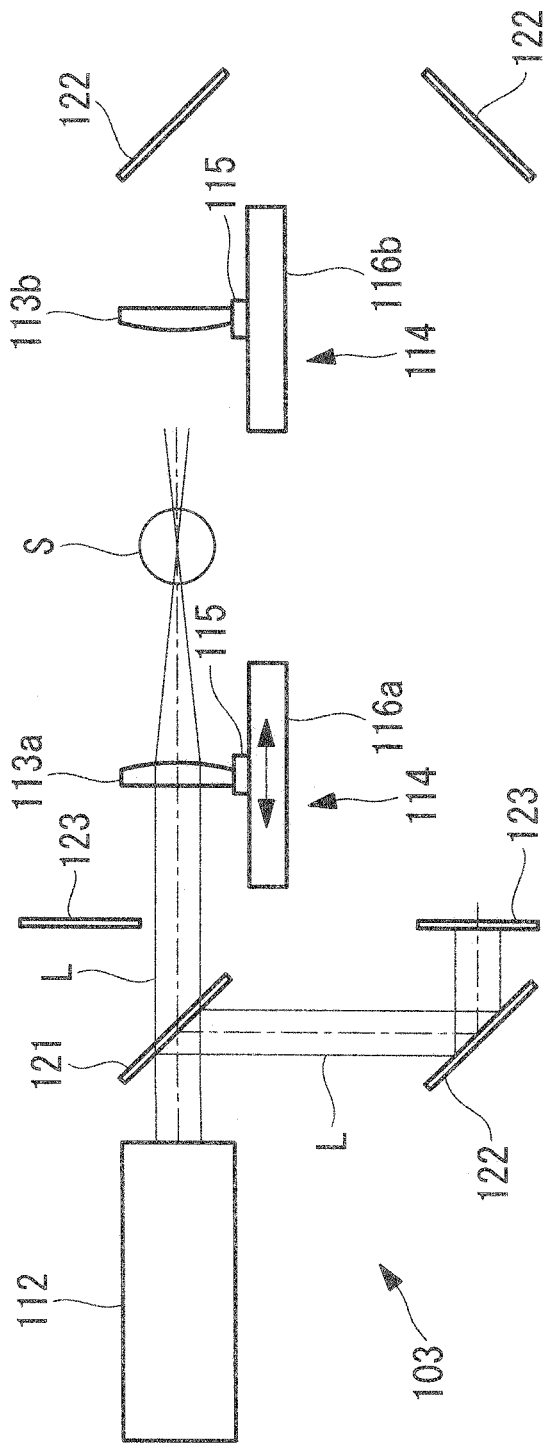
FIG. 10A shows a modification of the light source unit in FIG. 6A in the form of a side elevational view as seen when excitation light is incident on a specimen from one direction.

Also, this embodiment has been described by way of an example where the focal position of the excitation light L is moved via movement of the single cylindrical lens 113. Instead of this, two cylindrical lenses 113a and 113b may be moved, as shown in FIGS. 10A and 10B.

More specifically, linear guides 116a and 116b that movably support the two cylindrical lenses 113a and 113b may be disposed parallel to each other with the specimen S interposed therebetween. In the figures, reference numeral 121 denotes a half mirror that splits the excitation light L, and reference numeral 122 denotes a mirror that forms a split-off optical path. Reference numeral 123 denotes a shutter (illumination-direction switching section) that is alternately opened and closed.

With the above-described structure, the cylindrical lenses 113a and 113b can be set to move such that the focal position of the excitation light L via the cylindrical lens 113a covers one half of the specimen S and the focal position of the excitation light L via the cylindrical lens 113b covers the other half. If the specimen S contains scattering substances, the excitation light L is scattered more strongly the more deeply it enters the specimen S, thereby causing the planar shape of the excitation light L to be distorted.

According to this embodiment, the incidence depth of the excitation light L entering the specimen S can be restricted to half the size of the specimen S, thereby suppressing distortion of the excitation light L due to scattering and therefore allowing a clear fluorescence image to be acquired.

More specifically, the operation of opening and closing the shutters 123 to select the optical path along which the excitation light IL is incident on the specimen S from the left side thereof and to acquire a fluorescence image, as shown in FIG. 10A, and then opening and closing the shutters 123 to switch to the optical path along which the excitation light L is incident on the specimen S from the right side thereof and to acquire a fluorescence image, as shown in FIG. 10B, is repeated.

By doing so, image acquisition is carried out while the cylindrical lenses 113a and 113b are being moved in a step by step manner so as to shift the depths of focus of the excitation light L in order from FIG. 11A to FIG. 11H, thus allowing the depths of focus of the excitation light L via the left and right optical paths to cover one half and the other half, respectively, of the specimen S. As a result, a clear fluorescence image of a half of the specimen S can be acquired with the excitation light L passing through each of the optical paths, as shown in FIGS. 11I and 11J, and a clear composite image of the entire specimen S can be acquired by combining all acquired fluorescence images, as shown in FIG. 11K.

Figure 11A:
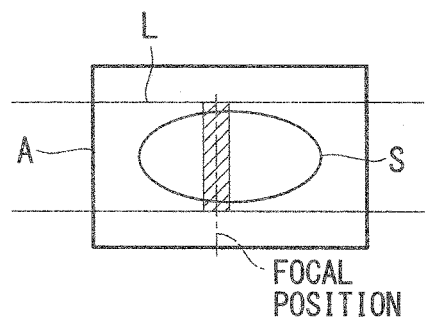
FIGS. 11A through 11H are diagrams respectively showing the depths of focus in a specimen when the focal position of excitation light from the light source unit in FIGS. 10A and 10B is moved sequentially.
Figure 11B:
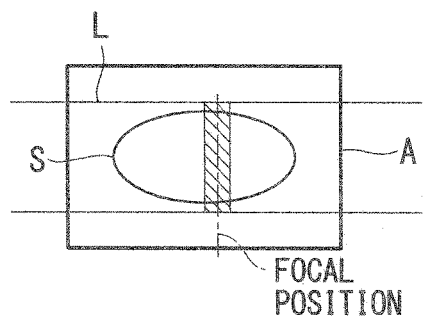
Figure 11C:
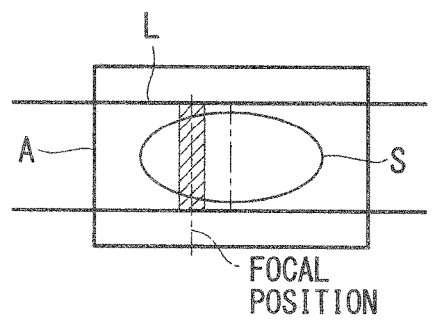
Figure 11D:
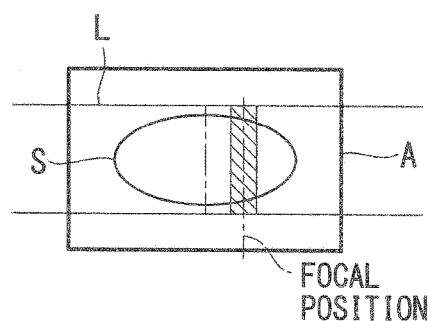
Figure 11E:
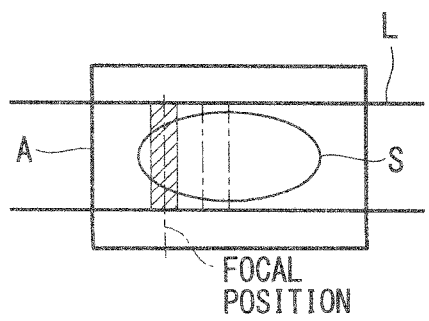
Figure 11F:
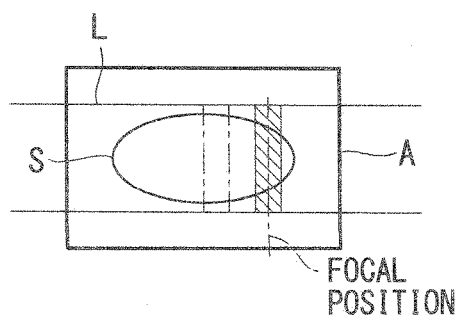
Figure 11G:
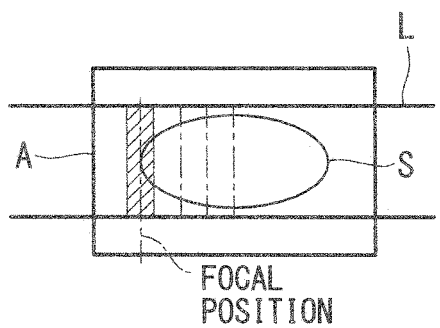
Figure 11H:
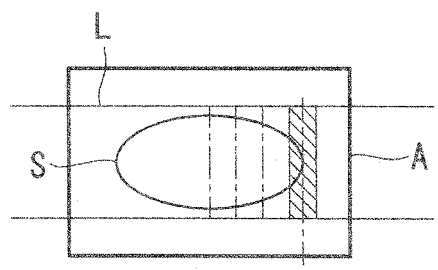
Figure 11I:
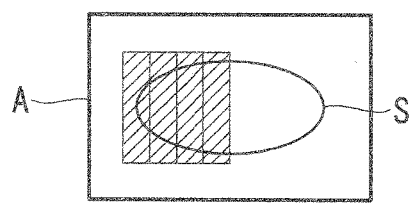
FIGS. 11I through 11K are diagrams showing composite images produced as a result of combining a plurality of fluorescence images acquired by the light source unit in FIGS. 10A and 10B.
Figure 11J:
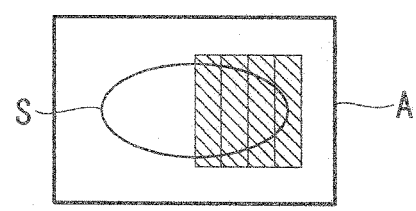
Figure 11K:
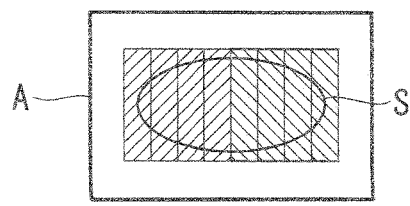
Figure 12:
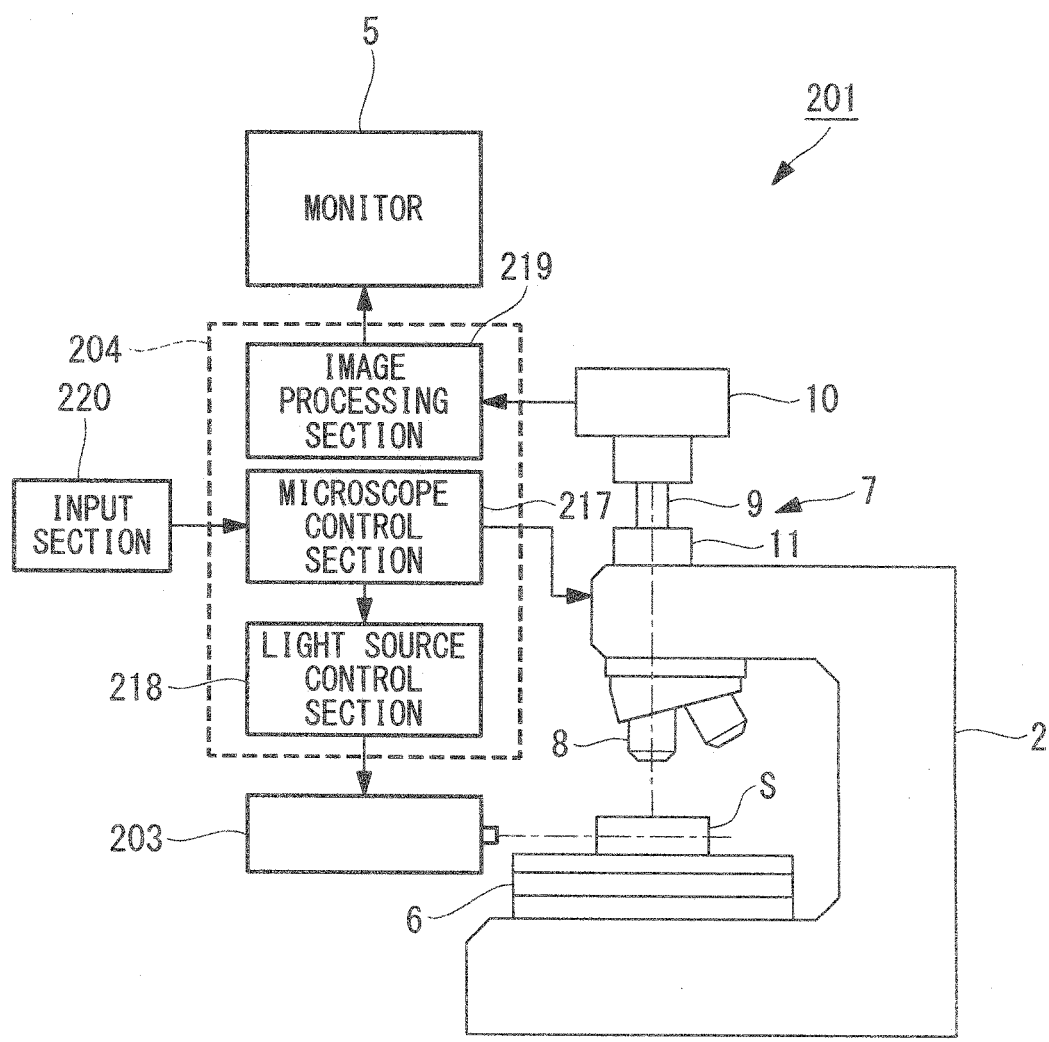
FIG. 12 is an overall schematic diagram showing a microscope according to a third embodiment of the present invention.

In this case, when the first fluorescence image is to be acquired by radiating the excitation light L from the left side of the specimen S, as shown in FIG. 11A, the cylindrical lens 113b may be moved to the initial position for radiating the excitation light L from the right side of the specimen S, as shown in FIG. 11B. When a fluorescence image is to be acquired by radiating the excitation light L from the right side of the specimen S, as shown in FIG. 11B, the cylindrical lens 113a may be moved to the next position for radiating the excitation light L from the left side of the specimen S, as shown in FIG. 11C. Thereafter, by alternately repeating the above-described operations, a plurality of fluorescence images can be acquired with reduced waste of time.

Furthermore, an insertable/removable total reflection mirror, instead of the half mirror 121, may be provided in the optical path to switch the direction of the excitation light L by switching between inserting and removing the total reflection mirror. In this case, the shutters 123 are not necessary.

In addition, this embodiment has been described by way of an example where the excitation light L is incident on the specimen S via two parallel optical paths from both sides of the specimen S, but this embodiment is not limited to such an example. Instead, the substantially planar excitation light L may be incident on the specimen S via three or more optical paths along the focal plane of the detection optical system 7.

A microscope 201 according to a third embodiment of the present invention will now be described with reference to the drawings.

The reference numbers and symbols in this embodiment described below refer to the same components as those having the same reference numbers and symbols in the microscope 1 of the first embodiment, and repeated descriptions of the same components are omitted.

The microscope 201 according to this embodiment differs from the microscope 1 of the first embodiment in the structure of a light source unit 203.

Figure 13A:
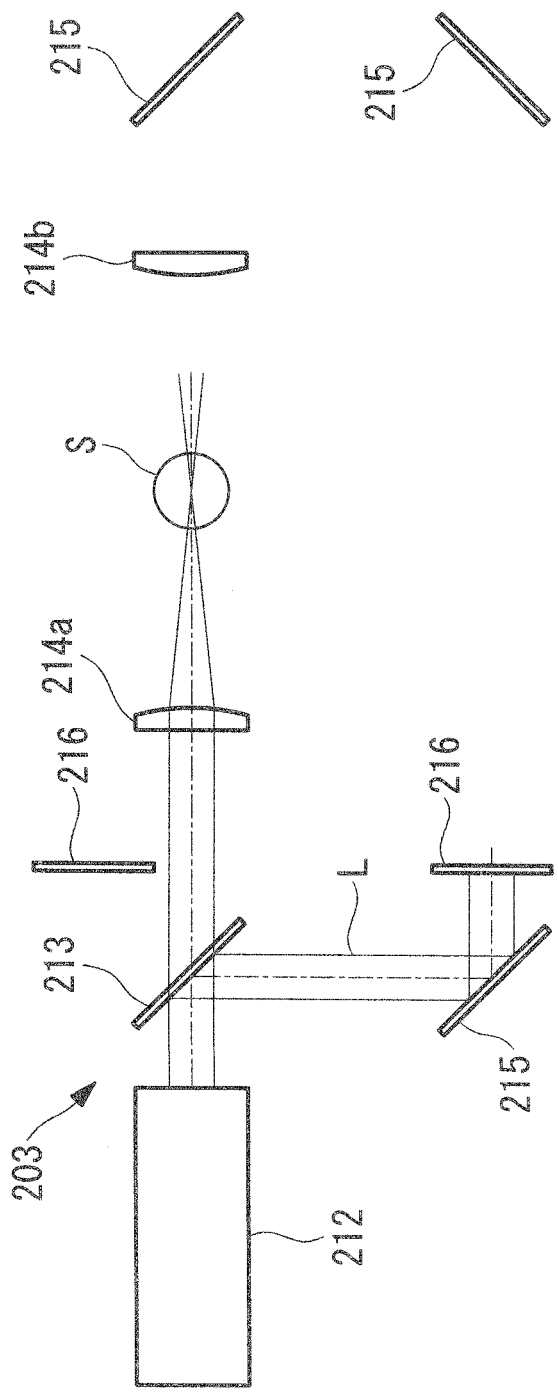
FIG. 13A is a side elevational view as seen when excitation light from the light source unit of the microscope in FIG. 12 is incident on a specimen from one direction.
Figure 13B:
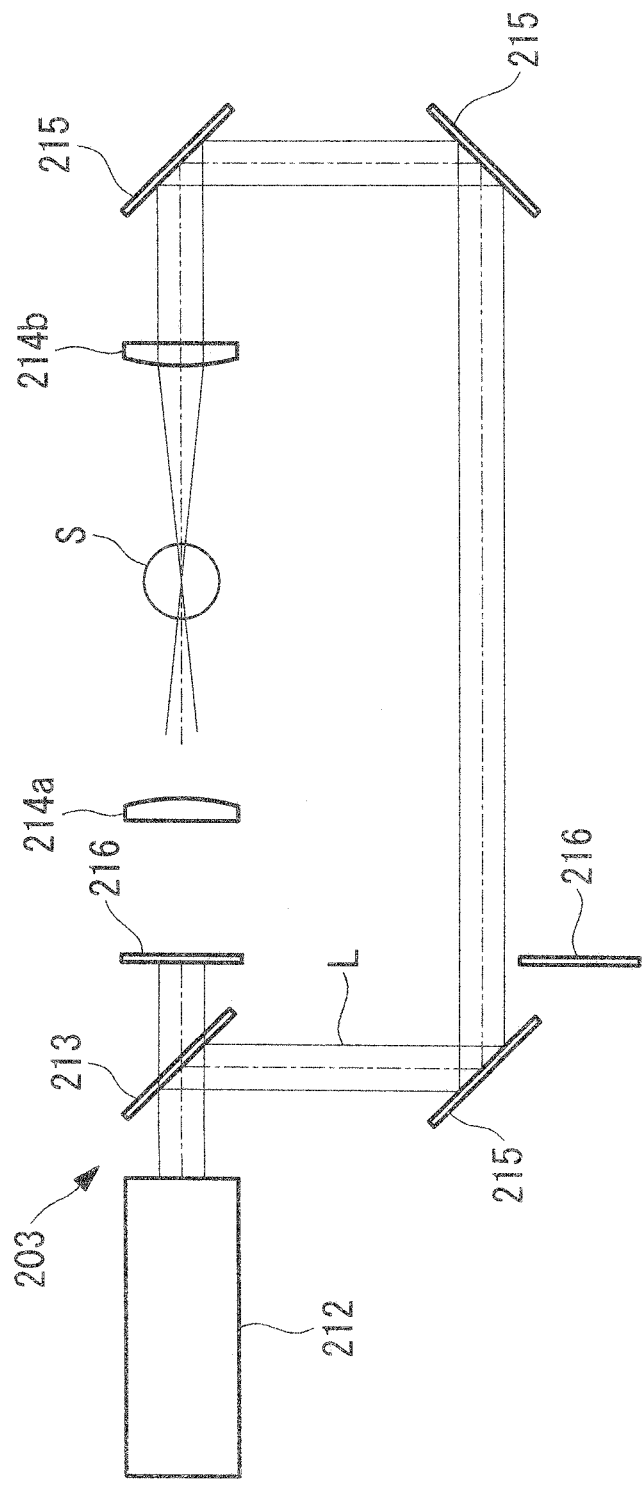
FIG. 13B is a side elevational view as seen when excitation light from the light source unit of the microscope in FIG. 12 is incident on the specimen from another direction.

As shown in FIGS. 13A and 13B, the light source unit 203 includes an excitation light source 212 that emits the excitation light L in the form of substantially collimated light; a half mirror 213 that splits into two optical paths the excitation light L in the form of substantially collimated light from the excitation light source 212; and two cylindrical lenses 214a and 214b that cause the excitation light L via the two separate optical paths to be incident on the specimen S such that the excitation light L takes a substantially planar shape and travels to the specimen S from two opposite directions along a plane passing through the specimen S.

The cylindrical lenses 214a and 214b are provided with power in one direction orthogonal to the optical axis and converge the excitation light L in the form of substantially collimated light into a line of a predetermined width equal to the diameter of that excitation light beam. In the figures, reference numeral 215 denotes a mirror that forms an optical path. Furthermore, reference numeral 216 denotes a shutter (illumination-direction switching section) that is provided in two optical paths and is alternately opened and closed.

The two optical axes of the excitation light L converged by the cylindrical lenses 214a and 214b extend along the same plane in a direction orthogonal to the optical axis of the detection optical system 7. Because of this, a range twice as large as the depth of focus, which is dependent on the numerical aperture of the excitation light L converged by each of the cylindrical lenses 214a and 214b, is irradiated with substantially planar excitation light (light-sheet illumination) L incident on the specimen S along the focal plane of the detection optical system 7, thereby allowing fluorescence to occur over a wide area of the focal plane in the specimen S all at once.

In this embodiment, half of the specimen S is disposed in a range twice as large as the depth of focus Z of the excitation light L calculated using the following Expression:

$$Z=\lambda/NA2$$

where $\lambda$ is the wavelength of the excitation light L, and NA is the numerical aperture.

A control section 204 includes a microscope control section (movement mechanism) 217 for controlling the microscope main body 202, a light source control section 218 for controlling the light source unit 203, and an image processing section 219 for processing an image signal acquired by the imaging device 10 to generate an image to be displayed on the monitor 5. The control section 204 is composed of a computer that includes an arithmetic processing unit and a memory to implement operations of the image processing section 219, as well as operations of the microscope control section 217 and the light source control section 218 (e.g., image generation; processing of instructions input from an input section 220; control of various electrically driven parts, such as the stage 6, a lens switch or a zoom mechanism, the filter wheel 11, and the shutter 216, and display by the monitor 5; and storage of various parameters).

In addition, the microscope control section 217 and the light source control section 218 include a control board for driving various electrically driven parts on the basis of a control signal from the computer.

The microscope control section 217 carries out control of the microscope main body 2, including movement of the specimen S through the operation of the stage 6 in response to an input from the input section 220 connected to the microscope control section 217, replacement or magnification adjustment of the objective lens 8 or the image-forming lens 9, and replacement of the filter through the operation of the filter wheel 11.

The light source control section 218 opens and closes the shutters 216 to set an optical path (the left optical path) via which the excitation light L is incident on the specimen S from one direction (to the left of the specimen S on the drawing of FIG. 13A) and acquire a fluorescence image, as shown in FIG. 13A, and then opens and closes the shutters 216 to switch to an optical path (the right optical path) via which the excitation light L is incident on the specimen S from another direction (to the right of the specimen S on the drawing of FIG. 13B) and acquire a fluorescence image, as shown in FIG. 13B.

The image processing section 219 combines the fluorescence image acquired when the excitation light L is incident from the left optical path of the light source unit 203 and the fluorescence image acquired when the excitation light L is incident from the right optical path of the light source unit 203 to generate a composite image.

More specifically, in combining a plurality of acquired fluorescence images, the image processing section 219 compares luminance values or contrast values of the corresponding pixels in the fluorescence images and selects a pixel having the maximum luminance value or the maximum contrast value.

A microscope image acquisition method using the microscope 201 according to this embodiment with the above-described structure will now be described.

Figure 15:
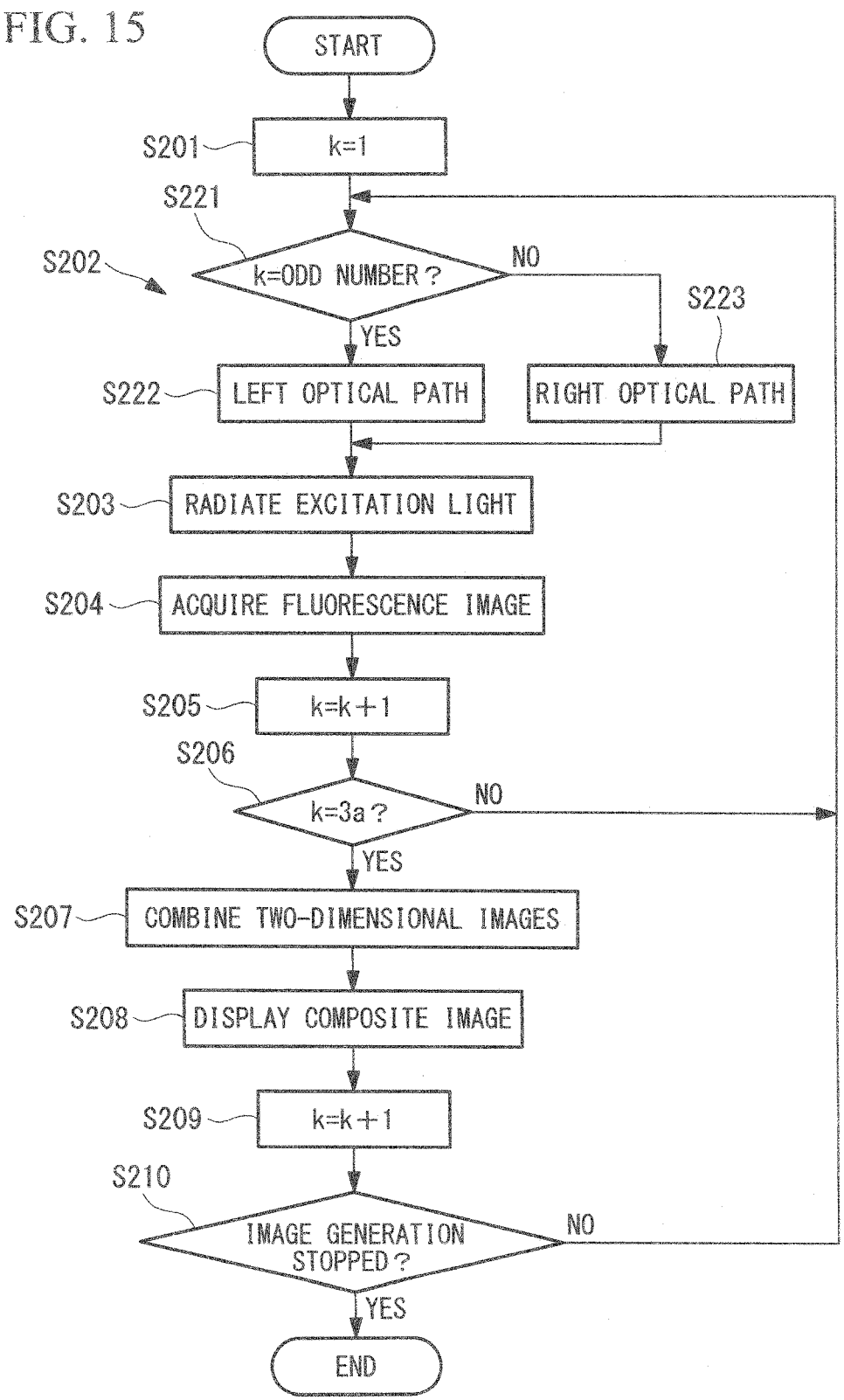
FIG. 15 is a diagram depicting a flowchart of a microscope image acquisition method according to the third embodiment of the present invention.

Referring to FIG. 15, the microscope image acquisition method according to this embodiment starts by resetting the counter k (step S201), and then the light source control section 218 selects one of the two directions along the focal plane of the detection optical system 7 (selection step S202).

In selection step S202, it is determined whether the counter k indicates an odd number (step S221). Because the counter k starts at one, the left optical path is selected (step S222).

Thereafter, planar excitation light L having a focal position in the left area of the specimen S is made incident on the specimen S along the left optical path selected in selection step S202 (incidence step S203), and fluorescence occurring on the focal plane in the specimen S as a result of the excitation light L being incident on the specimen S is detected by the detection optical system 7, thus acquiring a fluorescence image (detection step S204).

At this time, the counter k is incremented (step S205), and it is determined whether the counter k indicates a multiple of three (3a) (step S206). Because the counter k indicates two, steps S202 through S205 are repeated.

In the second iteration of the selection step S202, it is determined whether the counter k indicates an odd number (step S221). Because the counter k indicates two, the right optical path is selected (step S223).

Thereafter, planar excitation light L having a focal position in the right area of the specimen S is made incident on the specimen S along the right optical path selected in selection step S202 (incidence step S203), and fluorescence occurring on the focal plane in the specimen S as a result of the excitation light L being incident on the specimen S is detected by the detection optical system 7, thus acquiring a fluorescence image (detection step S204).

At this stage, the counter k is incremented (step S205), and it is determined whether the counter indicates a multiple of three (step S206). Because the counter k indicates three, the two fluorescence images acquired via the above-described two detecting operations in detection step S204 are combined by the image processing section 219 to generate a composite image (step S207). Here, the generated composite image is displayed on the monitor 5 (step S208). Then, the counter k is incremented (step S209) to indicate four.

Next, it is determined whether image generation is to be stopped (step S210). If image generation is not to be stopped, the steps from step S202 are repeated.

Figure 14A:
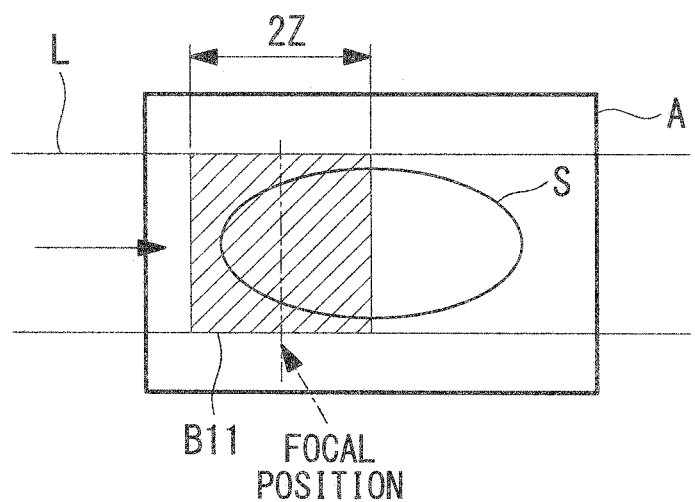
FIG. 14A is a diagram depicting the depth of focus in the specimen in the optical path of excitation light in FIG. 13A.
Figure 14B:
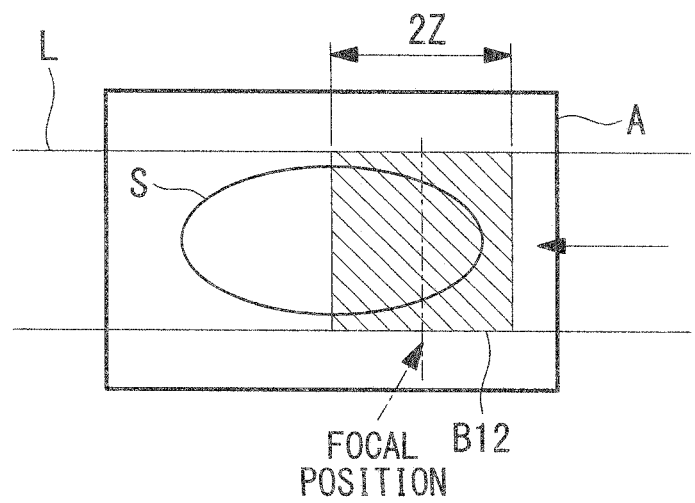
FIG. 14B is a diagram depicting the depth of focus in the specimen in the optical path of excitation light in FIG. 13B.

When the process returns to selection step S202 again, it is determined whether the counter k indicates an odd number (step S221). Because the counter k indicates four, the order in which an incident light path of the excitation light L is selected is reversed to select the right optical path (step S223), thereby acquiring a fluorescence image of the right area of the specimen S, as shown in FIG. 14B (steps S203 and S204). Then, the counter k is incremented (step S205), and it is determined whether the counter k indicates a multiple of three (3a) (step S206). Because the counter k indicates five, which is not a multiple of three, the process returns to step S202. Because the value five indicated by the counter k is an odd number, the left optical path is selected (step S222), and, as shown in FIG. 14A, a fluorescence image of the left area of the specimen S is acquired (steps S203 and S204).

Thereafter, because the counter k is incremented to indicate six, which is a multiple of six (steps S205 and S206), the two fluorescence images acquired via the above-described two detecting operations in detection step S204 are combined in the image processing section 219, and a two-dimensional composite image at the second focal plane Z2 is generated (step S207). Here, the generated composite image is displayed on the monitor 5 (step S208). Then, the counter k is incremented (step S209) to indicate seven. Next, it is determined whether image generation is to be stopped (step S210). When image generation is to be stopped, the processing ends.

Figure 16:
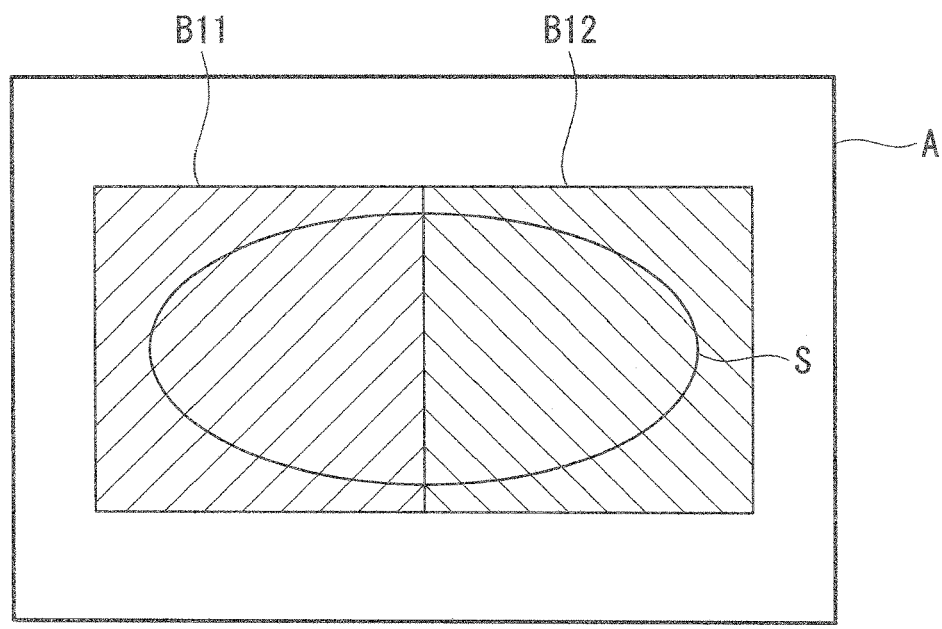
FIG. 16 is a diagram depicting a composite image produced as a result of combining fluorescence images acquired at the focal positions in FIGS. 14A and 14B.

For the acquired fluorescence images, the contrast is high in the band-shaped regions (hatched regions B11 and B12 in FIG. 14A and FIG. 14B), each of which is equivalent to an area twice as large as the depth of focus with respect to the focal position, whereas the contrast is low in other regions. For this reason, in step S207, the contrast values, for example, of corresponding pixels in the acquired fluorescence images are compared, and the luminance value of the pixel with the maximum contrast value is selected. In this manner, an accurately focused, clear composite image can be generated over the wide area in the field of view A, as shown in FIG. 16.

In other words, with the microscope 201 and the microscope image acquisition method of this embodiment, because of the excitation light L incident along two different directions from outside the specimen S, the excitation light L along each of the two directions is allowed to enter the specimen S only shallowly, thereby suppressing the adverse effect of scattering in the specimen S and therefore making it possible to acquire a clear fluorescence image.

Thus, an advantage is afforded in that even if excitation light beams L having the same wavelength or overlapping wavelengths are radiated onto neighboring regions or overlapping regions in the same specimen S, the excitation light beams L from two directions can be prevented from mixing with each other by alternately switching between the excitation light beams L along the two different directions so that those excitation light beams L are sequentially incident, thereby making it possible to acquire a clear fluorescence image in a range twice as large as the depth of focus of the individual excitation light beams L.

One set of fluorescence images acquired by switching between the incidence directions of the excitation light L in order of the left optical path and the right optical path is combined into one composite image, which is then displayed on the monitor 5. Thereafter, the next set of fluorescence images acquired by switching between the incidence directions of the excitation light L in order of the right optical path and the left optical path, namely starting with the same direction employed during the previous image acquisition, is combined into a composite image, which is then displayed on the monitor 5. By doing so, an advantage is afforded in that the number of times the incidence direction of the excitation light L is switched is reduced to shorten the time interval from one image acquisition to another, thereby allowing a fluorescence image to be acquired quickly for display on the monitor 5.

In this embodiment, the image processing section 219 generates a composite image by selecting the luminance value of the pixel that gives the maximum contrast value from among the corresponding pixels. Instead of this, the luminance value of the pixel that gives the maximum luminance value from among the corresponding pixels may be selected.

Furthermore, this embodiment has been described by way of an example where the excitation light L is split by the half mirror 213 to travel along two optical paths, which are switched to each other by alternately opening and closing the shutters 216. Instead of this, an insertable/removable total reflection mirror may be provided in the optical path to switch the direction of the excitation light L by switching between inserting and removing the total reflection mirror. In this case, the shutters 216 are not necessary.

A microscope and a microscope image acquisition method according to a fourth embodiment of the present invention will now be described with reference to the drawings.

The microscope according to this embodiment differs from the microscope 201 and the microscope image acquisition method according to the third embodiment in that the stage 6 of the microscope main body 2 and the light source unit 203 are controlled in such a manner as to be operatively associated with each other.

Figure 17A:
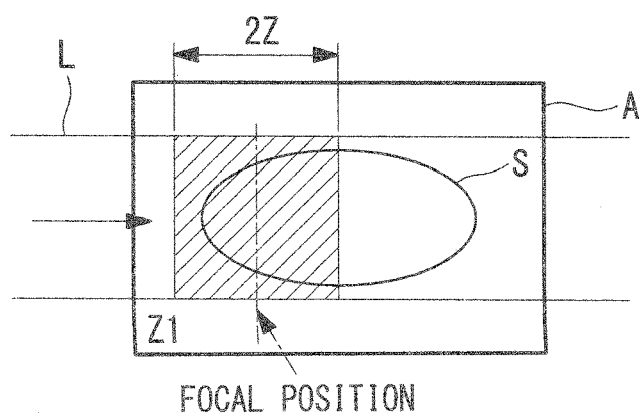
FIG. 17A is a diagram depicting the depth of focus of excitation light in a specimen when the excitation light is radiated from the optical path to the left of the specimen at the first focal plane by the use of a microscope according to a fourth embodiment of the present invention.
Figure 17B:
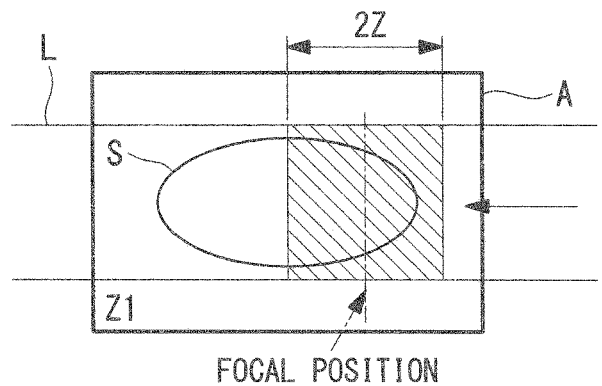
FIG. 17B is a diagram depicting the depth of focus of excitation light in the specimen when the excitation light is radiated from the optical path to the right of the specimen at the first focal plane by the use of the microscope according to the fourth embodiment of the present invention.
Figure 17C:
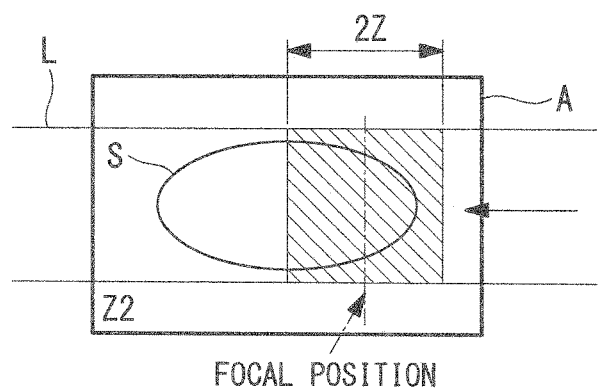
FIG. 17C is a diagram depicting the depth of focus of excitation light in the specimen when the excitation light is radiated from the optical path to the left of the specimen at the next focal plane by the use of the microscope according to the fourth embodiment of the present invention.
Figure 17D:
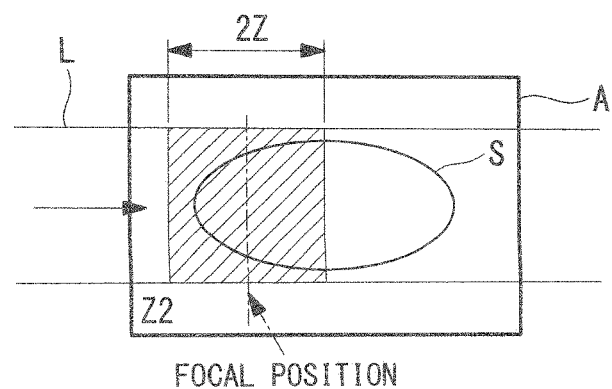
FIG. 17D is a diagram depicting the depth of focus of excitation light in the specimen when the excitation light is radiated from the optical path to the right of the specimen at the next focal plane by the use of the microscope according to the fourth embodiment of the present invention.

More specifically, in the same manner as the microscope 201 of the third embodiment, the microscope according to this embodiment repeats the operation of irradiating the specimen S with the excitation light L along each of the optical paths on the left and right of the specimen S to produce a two-dimensional image at the first focal plane Z1 of the detection optical system 7, as shown in FIGS. 17A and 17B, and thereafter moving the stage 6 by a predetermined amount in the optical-axis direction of the detection optical system 7 by means of the microscope control section 217 to move the focal plane, in the specimen S. of the detection optical system 7 to the next focal plane Z2 to acquire fluorescence images at that position and produce a two-dimensional image, as shown in FIGS. 17C and 17D.

A three-dimensional image of the specimen S can be produced by acquiring a plurality of composite images at different positions in the optical-axis direction of the detection optical system 7.

In this case, the light source control section 218 of the microscope according to this embodiment reverses the order in which the optical path for incidence of the excitation light L is selected between neighboring focal planes. For example, for the first focal plane Z1, the excitation light L is made incident in the order of the left optical path and the right optical path, whereas for the next focal plane Z2, the excitation light L is made incident in the order of the right optical path and the left optical path. Furthermore, for the next focal plane, the excitation light L is made incident in the order of the left optical path and the right optical path.

The microscope image acquisition method using the microscope according to this embodiment with the above-described structure will now be described with reference to FIG. 18.

Figure 18:
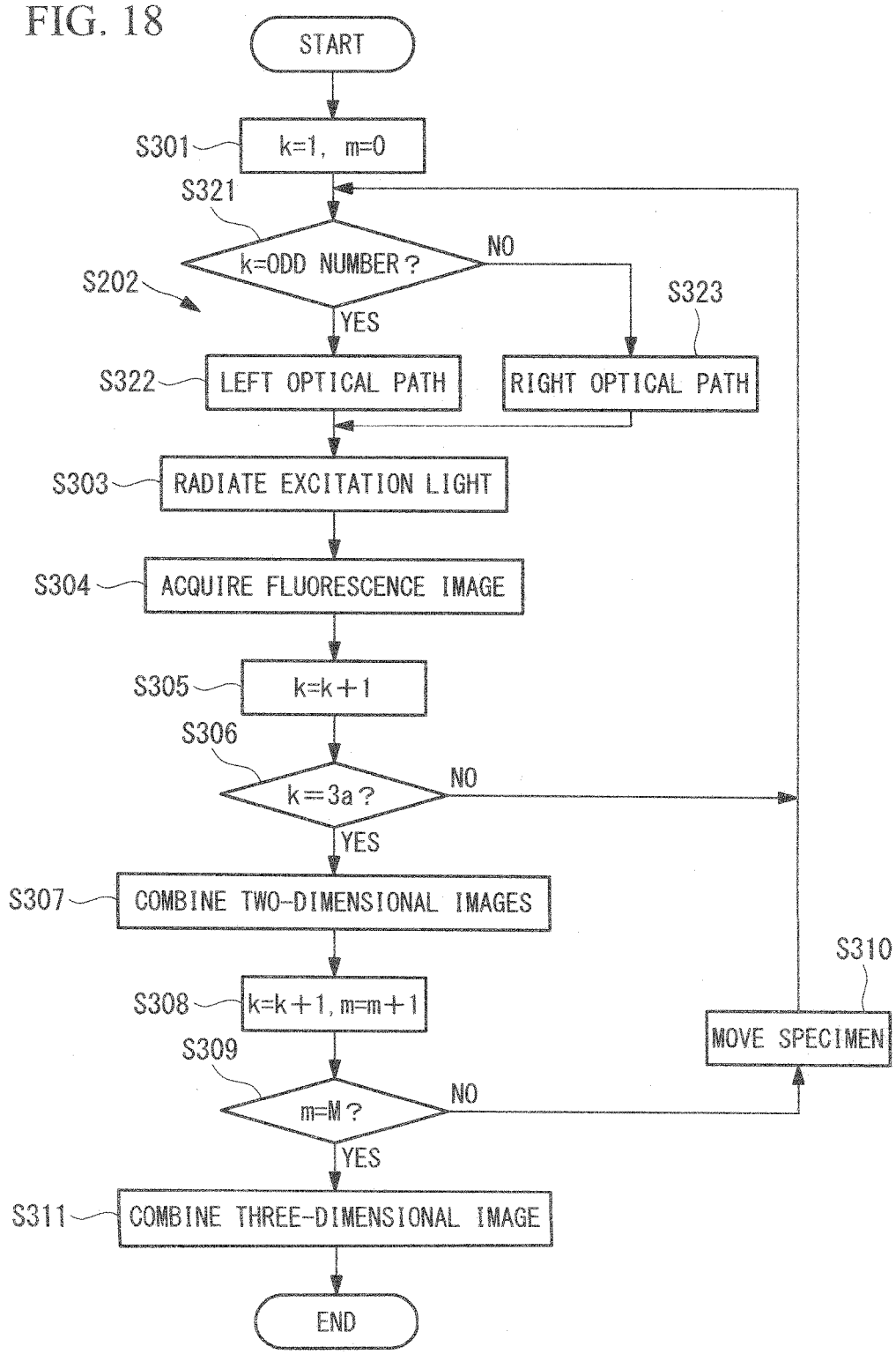
FIG. 18 is a diagram depicting a flowchart of the microscope image acquisition method according to the fourth embodiment of the present invention.
Figure 19A:
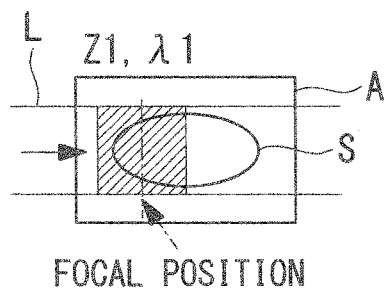
FIGS. 19A through 19L are diagrams showing the depths of focus of excitation light in a specimen using a modification of the microscope according to the fourth embodiment of the present invention.
Figure 19B:
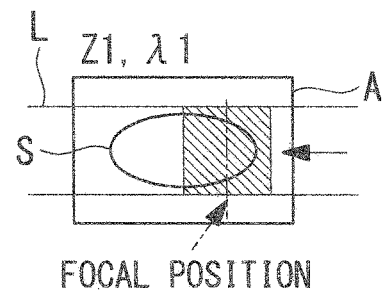
Figure 19C:
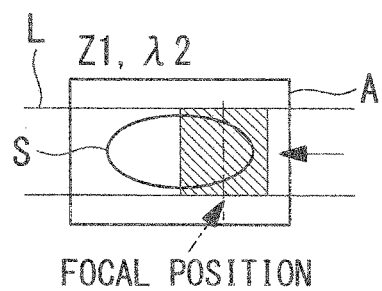
Figure 19D:
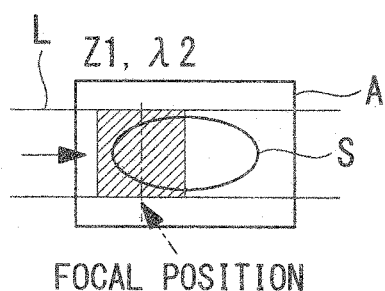
Figure 19E:
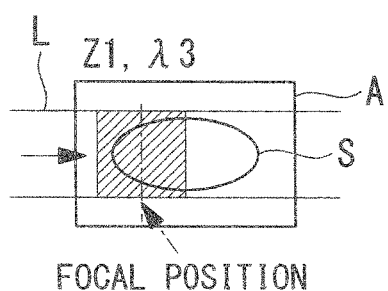
Figure 19F:
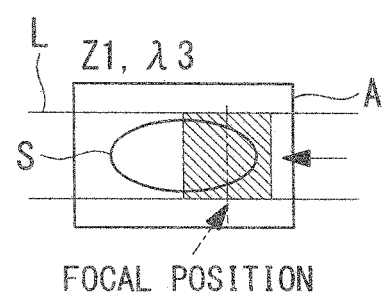
Figure 19G:
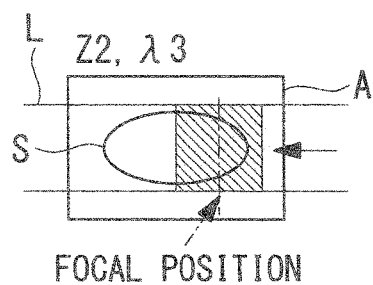
Figure 19H:
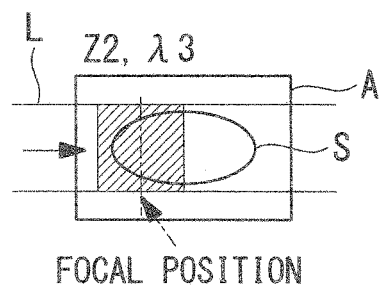
Figure 19I:
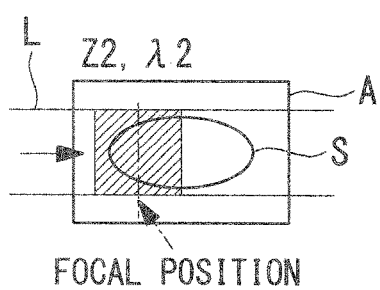
Figure 19J:
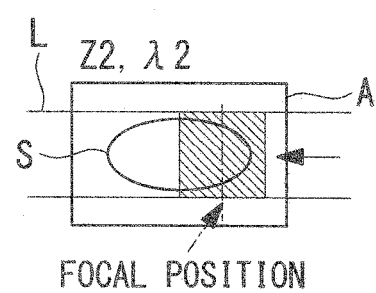
Figure 19K:
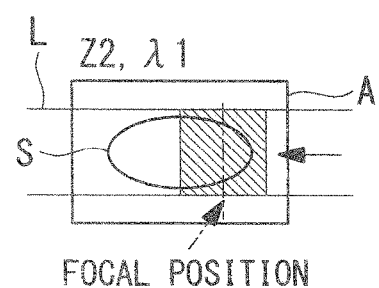
Figure 19L:
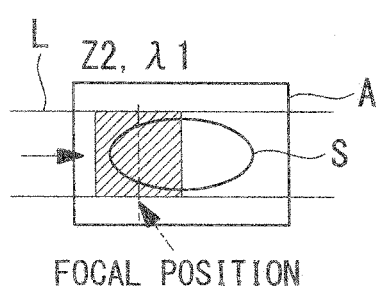

Referring to FIG. 18, the microscope image acquisition method according to this embodiment starts by resetting counters k and m (step S301), and then the light source control section 218 selects one of the two directions along the focal plane of the detection optical system 7 (selection step S302).

In the selection step S302, it is determined whether the counter k indicates an odd number (step S321), and because the counter k indicates one, the left optical path is selected (step S322).

Thereafter, as shown in FIG. 17A, the planar excitation light L having a focal position in the left area of the specimen S is incident on the specimen S along the left optical path selected in the selection step S302 (incidence step S303), and the detection optical system 7 detects fluorescence occurring on the focal plane in the specimen S as a result of the excitation light L being incident on the specimen S to acquire a fluorescence image (detection step S304).

At this time, the counter k is incremented (step S305), and it is determined whether the counter k indicates a multiple of three (3a) (step S306). Because the counter k indicates two, which is not a multiple of three, steps S302 through S305 are repeated.

In the second iteration of the selection step S302, it is determined whether the counter k indicates an odd number (step S321). Because the counter k indicates two, the right optical path is selected (step S323).

Thereafter, as shown in FIG. 17B, the planar excitation light L having a focal position in the right area of the specimen S is incident on the specimen S along the right optical path selected in selection step S302 (incidence step S303), and the detection optical system 7 detects fluorescence occurring on the focal plane in the specimen S as a result of the excitation light L being incident on the specimen S to acquire a fluorescence image (detection step S304).

At this stage, the counter k is incremented (step S305), and it is determined whether the counter k is a multiple of three (step S306). Because the counter k indicates three, the two fluorescence images acquired in the above-described detection step S304 are combined in the image processing section 219, and thus a two-dimensional composite image at the first focal plane Z1 is generated (step S307). Here, the counters k and m are incremented (step S308), where the counter k indicates four and the counter m indicates one.

Next, it is determined whether the counter m indicates a predetermined value M (step S309). For the predetermined value M, any value is preset as the number of two-dimensional images to be acquired. If the counter m does not indicate the predetermined value M, the microscope control section 217 drives the stage 6 to move the specimen S by a predetermined amount in the optical-axis direction of the detection optical system 7 (step S310), and then the steps from step S302 are repeated.

When the process returns to the selection step S302 once again, it is determined whether the counter k indicates an odd number (step S321). Because the counter k indicates four, the order in which an incident light path of the excitation light. L is selected is reversed to select the right optical path (step S323), thereby acquiring a fluorescence image of the right area of the specimen S, as shown in FIG. 17C (steps S303 and S304). Thereafter, the counter k is incremented (step S305), and it is determined whether the counter k indicates a multiple of three (3a) (step S306). Because the counter k indicates five, which is not a multiple of three, the process returns to step S302. Because the value five indicated by the counter k is an odd number, the left optical path is selected (step S322), and a fluorescence image of the left area of the specimen S is acquired, as shown in FIG. 17D (steps S303 and S304).

Thereafter, because the counter k is incremented to indicate six, which is a multiple of six (steps S305 and S306), the two fluorescence images acquired via the above-described two detecting operations in the detection step S304 are combined in the image processing section 219, and a two-dimensional composite image at the second focal plane Z2 is generated (step S307).

If the counter in indicates the predetermined value M, the plurality of two-dimensional composite images that have been acquired are further combined into a three-dimensional fluorescence image in the image processing section 219 (combine step S311).

As described above, according to the microscope and the microscope image acquisition method of this embodiment, an accurately focused, clear composite image over a large area in the field of view A can be acquired in the same manner as with the microscope 201 and the microscope image acquisition method according to the third embodiment. In addition, this embodiment affords an advantage in that, because the incident light path of the excitation light L is not switched between before and after the specimen is moved in the optical-axis direction of the detection optical system, the number of times the optical paths are switched by opening and closing the shutters 216 can be reduced, thus reducing the time required to acquire a three-dimensional image.

Although the above-described embodiments have been described by way of an example where the wavelength λ of the excitation light L is not changed, the wavelength λ of the excitation light L may be switched.

In this case, the microscope image acquisition method according to the above-described second embodiment may be carried out for each wavelength of the excitation light L.

Alternatively, the same incidence direction of the excitation light L may be maintained regardless of the switching of the wavelength of the excitation light L.

More specifically, referring to FIGS. 19A through 19L, in a case where excitation light beams L having wavelengths $\lambda 1$ through $\lambda 3$ are to be made incident via the left and right optical paths with the focal plane Z1, in the specimen S, of the detection optical system 7 being immobilized, the excitation light L is incident in the order of the left optical path (FIG. 19A) and the right optical path (FIG. 19B) for the wavelength $\lambda 1$, in the order of the right optical path (FIG. 19C) and the left optical path (FIG. 19D) for the wavelength $\lambda 2$, and in the order of the left optical path (FIG. 19E) and the right optical path (FIG. 19F) for the wavelength $\lambda 3$, thereby reducing the number of times the optical paths are switched as a result of switching from one wavelength to another.

Next, the specimen S is moved to shift the focal plane, in the specimen S, of the detection optical system 7 to the focal plane Z2. In this case, the focal plane is moved to and immobilized at the focal plane Z2 with the wavelength $\lambda 3$, used during the processing in FIG. 19F, maintained as is to cause the excitation light L to be incident in the order of the right optical path (FIG. 19G) and the left optical path (FIG. 19H) for the wavelength $\lambda 3$. Subsequently, the wavelength is switched to wavelength $\lambda 2$, and processing is continued in the order of the left optical path (FIG. 19I) and the right optical path (FIG. 19J) for the wavelength $\lambda 2$, and then in the order of the right optical path (FIG. 19K) and the left optical path (FIG. 19L) for the wavelength $\lambda 1$. By doing so, the number of times the optical paths are switched as a result of switching of the wavelengths and focal planes can be minimized. Any number of focal planes and any number of wavelengths can be switched.

Furthermore, the above-described embodiments have been described by way of an example where the excitation light L is incident on the specimen S from two opposite directions. Instead of this, the excitation light L may be made incident from three or more different directions.

In addition, the present invention is not limited to the above-described individual embodiments. Instead, those embodiments may be combined with each other.

The above-described embodiments can be derived from each of the following aspects of the present invention.

One aspect of the present invention provides a microscope including: a detection optical system that detects fluorescence emitted from a specimen; a light-sheet illumination optical system that causes planar excitation light to be incident along a direction intersecting an optical axis of the detection optical system; and a control section that, when a magnification of the detection optical system is raised, controls the light-sheet illumination optical system so as to reduce a radiation width of the excitation light that is incident on the specimen from the light-sheet illumination optical system.

According to this aspect, when the light-sheet illumination optical system causes the planar excitation light to be incident on the specimen, fluorescent substances in the specimen are excited along the incidence plane to produce fluorescence. The generated fluorescence is detected by the detection optical system having an optical axis intersecting the light-sheet illumination optical system. If the incidence position of the excitation light is made to coincide with the focal position of the detection optical system, fluorescence does not occur from the part of the specimen disposed closer to the observer relative to that focal position, and therefore, fluorescence only from the focal plane can be detected, thereby allowing a clear image to be acquired.

In this case, when the magnification of the detection optical system is changed, the field of view changes according to the change in the magnification. More specifically, because the field of view becomes narrower when the magnification of the detection optical system is increased, the control section controls the light-sheet illumination optical system so as to reduce the radiation width of the excitation light, thereby preventing areas not intended for observation from being illuminated with the excitation light. By doing so, the specimen can be prevented from deteriorating or color fading due to unwanted exposure with excitation light resulting from switching the magnification.

In the above-described aspect, the detection optical system may include an imaging device that acquires fluorescence, and the control section may calculate the radiation width of the excitation light that is incident on the specimen from the light-sheet illumination optical system on the basis of the magnification of the detection optical system and a size of the imaging device.

By doing so, when the magnification of the detection optical system is set, the largest possible field of view for allowing acquisition of fluorescence within the size of the imaging device at that magnification can be calculated.

As a result, the largest possible field of view can be secured, while the control section still prevents unwanted exposure with the excitation light resulting from switching the magnification.

Furthermore, in the above-described aspect, the light-sheet illumination optical system may include: an excitation-light-forming optical system that forms planar excitation light having a predetermined width; and a scanning section that scans the planar excitation light formed by the excitation-light-forming optical system in a width direction of the planar excitation light.

By doing so, as a result of the scanning section scanning the planar excitation light in the width direction thereof, i.e., the planar excitation light having the predetermined width formed by the excitation-light-forming optical system of the light-sheet illumination optical system, the radiation width in the specimen can be adjusted easily.

Furthermore, in the above-described aspect, the scanning section may include a galvanometer mirror that swivels in the width direction of the excitation light, and the control section may control a swivel angle of the galvanometer mirror.

By doing so, as a result of the control section controlling the swivel angle of the galvanometer mirror, the scanning range of the planar excitation light having the predetermined width can be adjusted, and hence the radiation width in the specimen can be adjusted easily.

Another aspect of the present invention provides a microscope including: a detection optical system that detects fluorescence emitted from a specimen to acquire a fluorescence image; a light-sheet illumination optical system that causes planar excitation light to be incident along a direction intersecting an optical axis of the detection optical system; and an image processing section that processes the image acquired by the detection optical system, wherein the light-sheet illumination optical system moves a focal position of the excitation light along an incidence direction thereof, and the image processing section combines a plurality of the fluorescence images that are acquired by the detection optical system each time the excitation light is made incident on a different focal position by the light-sheet illumination optical system, thereby generating a composite image.

According to this aspect, when the light-sheet illumination optical system causes the planar excitation light to be incident on the specimen, a fluorescent substance in the specimen is excited along the incidence plane to produce fluorescence. The generated fluorescence is detected by the detection optical system having an optical axis intersecting the light-sheet illumination optical system. If the incidence position of the excitation light is made to coincide with the focal plane of the detection optical system, fluorescence does not occur from the part of the specimen disposed closer to the observer relative to this focal plane, and therefore, fluorescence only from the focal plane can be detected, thereby allowing a clear image to be acquired.

In this case, although the excitation light generated by the light-sheet illumination optical system takes a thin planar shape within the depth of focus adjacent to its focal position, it becomes thick and loses its planar shape in areas away from its focal position. For this reason, if the range to be observed exceeds the depth of focus, the fluorescence image to be acquired suffers from a decrease in sharpness. According to this aspect, while the depth of focus of the excitation light is being moved along the focal plane of the detection optical system by moving the focal position of the excitation light along the incidence direction, a fluorescence image is acquired at each of the positions. Thus, clear fluorescence images can be acquired by detecting fluorescence only from the focal plane at different positions.

Then, by combining a plurality of fluorescence images acquired in this manner, a composite image having high sharpness can be generated over a wider range.

In other words, even if a sufficiently large depth of focus of the excitation light itself cannot be secured, a clear composite image of the specimen over a wide range can be acquired by combining a plurality of fluorescence images having different clear areas.

In the above-described aspect, the light-sheet illumination optical system may be capable of setting a movement start position, a number of movement steps, and a displacement of each movement step for the focal position of the excitation light.

In this manner, a clear fluorescence image in a desired range can be acquired by moving the focal position of the excitation light to the set movement start position and acquiring a fluorescence image while repeating movement by the set displacement the same number of times as the set number of movement steps.

Furthermore, in the above-described aspect, the light-sheet illumination optical system may be capable of switching a wavelength of the excitation light and may be capable of setting the movement start position and the displacement for each wavelength of the excitation light.

By doing so, even if the focal position changes as a result of switching between wavelengths of the excitation light in order to carry out fluoroscopy under different conditions, a clear composite image in a desired range can be acquired by using the movement start position and displacement set for each wavelength.

Furthermore, in the above-described aspect, the light-sheet illumination optical system may be capable of causing the excitation light to be incident alternately from two or more different directions from outside the specimen.

By doing so, even if the specimen contains a scattering substance and the degree of progression of the excitation light is low, the excitation light can advance deeply into the specimen by causing the excitation light to be incident on the specimen from different directions, thereby allowing a clear composite image of the specimen to be acquired over a wide range.

Furthermore, in the above-described aspect, the light-sheet illumination optical system may be capable of causing the excitation light to be incident from both sides with respect to the optical axis of the detection optical system.

By doing so, it is sufficient if the excitation light advances to a depth equal to half the thickness of the specimen, and a clear composite image of the specimen over a wide range can be acquired more efficiently due to incidence of the excitation light from two directions.

Furthermore, still another aspect of the present invention provides a microscope image acquisition method including: a radiation step of causing planar excitation light extending along one direction to be incident on a specimen; a movement step of moving a focal position of the excitation light along an incidence direction thereof; a detection step of detecting fluorescence that is emitted from the specimen each time the focal position of the excitation light is moved in the movement step to acquire a fluorescence image; and a combination step of combining a plurality of the fluorescence images acquired in the detection step to generate a composite image.

Furthermore, the above-described aspect may include a control section that controls the light-sheet illumination optical system so as to reduce a radiation width of the excitation light to be made incident on the specimen by the light-sheet illumination optical system when a magnification of the detection optical system is raised.

Furthermore, in the above-described aspect, the light-sheet sheet illumination optical system may include: an excitation-light-forming optical system that forms planar excitation light having a predetermined width; and a scanning section that scans the planar excitation light formed by the excitation-light-forming optical system in a width direction of the planar excitation light, and the control section may control a swivel angle of the scanning section.

Furthermore, in the above-described aspect, the light-sheet illumination optical system may include an illumination-direction switching section that alternately switches the incidence direction between two or more different directions from outside the specimen to sequentially cause the excitation light to be incident along a plane intersecting the optical axis of the detection optical system; and an image processing section that combines a plurality of the fluorescence images acquired by the detection optical system when the excitation light is incident along a different incidence direction, and the light-sheet illumination optical system may switch the incidence direction of the excitation light in such an order that the excitation light is made incident starting from a direction equal to an identical incidence direction between before and after combining processing by the image processing section.

Furthermore, the above-described aspect may include: an illumination-direction switching section that alternately switches the incidence direction between two or more different directions from outside the specimen to sequentially cause the planar excitation light to be incident along a plane intersecting the optical axis of the detection optical system; an image processing section that combines a plurality of the fluorescence images acquired by the detection optical system when the excitation light is incident along a different incidence direction; a movement mechanism that moves the specimen in an optical-axis direction of the detection optical system; and a control section that controls the illumination-direction switching section and the movement mechanism, wherein when the fluorescence image based on the planar excitation light that is incident along each of the different direction is acquired, the control section controls the movement mechanism so as to move the specimen to a different position in the optical-axis direction and controls the illumination-direction switching section so as to switch the incidence direction of the excitation light in such an order that the excitation light is made incident starting from a direction equal to an identical incidence direction between before and after movement of the specimen by the movement mechanism.

Still another aspect of the present invention is a microscope including: a detection optical system that detects fluorescence emitted from a specimen to acquire a fluorescence image; a light-sheet illumination optical system that alternately switches an incidence direction between two or more different directions from outside the specimen to sequentially cause planar excitation light to be incident along a plane intersecting an optical axis of the detection optical system; and an image processing section that combines a plurality of the fluorescence images acquired by the detection optical system when the excitation light is incident along a different incidence direction, wherein the light-sheet illumination optical system switches an incidence direction of the excitation light in such an order that the excitation light is made incident starting from a direction equal to an identical incidence direction between before and after combining processing by the image processing section.

According to this aspect, the light-sheet illumination optical system causes the planar excitation light to be incident from outside the specimen along the plane intersecting the optical axis of the detection optical system, and hence, by causing the focal plane of the detection optical system to coincide with the incidence plane, fluorescence generated in a wide range along the focal plane can be detected all at once by the detection optical system. In this case, because of the excitation light being incident along two or more different directions from outside the specimen, the excitation light along each of the directions is allowed to enter the specimen only shallowly, thereby suppressing the adverse effect of scattering in the specimen and therefore making it possible to acquire a clear fluorescence image.

Even if excitation light beams having the same wavelength or overlapping wavelengths are radiated onto neighboring regions or overlapping regions in the same specimen, the excitation light beams along two or more directions can be prevented from mixing with each other by alternately switching between the excitation light beams along the two or more different directions so that those excitation light beams are sequentially incident, thereby making it possible to acquire a clear fluorescence image in the depth of focus of each of the excitation light beams. By combining the plurality of acquired fluorescence images in the image processing section, fluoroscopy can be carried out over a wide range of the specimen.

Then, one set of fluorescence images acquired by sequentially switching between the incidence directions of the excitation light are combined in the image processing section. Thereafter, the next set of fluorescence images are acquired by sequentially switching between the incidence directions of the excitation light in an order starting with the same direction employed during the previous image acquisition and then combined into a composite image, thereby reducing the number of times the incidence direction of the excitation light is switched and therefore allowing fluorescence images to be acquired at high speed.

In the above-described aspect, the light-sheet illumination optical system may include a movement mechanism that moves the specimen in an optical-axis direction of the detection optical system and switch the incidence direction of the excitation light in such an order that the excitation light is made incident starting from a direction equal to an identical incidence direction between before and after movement of the specimen by the movement mechanism.

With this structure, as a result of the specimen being moved in the optical-axis direction of the detection optical system through the operation of the movement mechanism, two-dimensional fluorescence images can be acquired at different positions to carry out three-dimensional fluoroscopy of the specimen. In this case, as a result of the incidence direction of the excitation light not being changed between before and after the specimen is moved by means of the movement mechanism, the number of times the incidence direction of the excitation light is switched is reduced, thereby reducing the time required for switching and hence reducing the time required for acquisition of fluorescence images.

Furthermore, in the above-described aspect, the light-sheet illumination optical system may be provided such that a wavelength of the excitation light is switchable and may switch the incidence direction of the excitation light in such an order that the excitation light is made incident starting from a direction equal to an identical incidence direction between before and after switching the wavelength of the excitation light.

With this structure, fluoroscopy with different wavelengths can be carried out by switching between the wavelengths of the excitation light using the light-sheet illumination optical system. In this case, although fluorescence images are acquired by causing the excitation light to be incident along a plurality of incidence directions for each wavelength, the number of times the incidence direction of the excitation light is switched is reduced as a result, of the incidence direction of the excitation light not being changed between before and after the wavelength is switched, thereby reducing the time required for switching and hence reducing the time required for acquisition of fluorescence images.

Furthermore, in the above-described aspect, the light-sheet illumination optical system may be capable of causing the excitation light to be incident from both sides with respect to the optical axis of the detection optical system.

By doing so, it is sufficient if the excitation light advances to a depth equal to half the thickness of the specimen, and a clear composite image of the specimen over a wide range can be acquired more efficiently due to incidence of the excitation light from two directions.

Still another aspect of the present invention provides a microscope image acquisition method including: a selection step of alternately selecting a direction from among a plurality of different directions along an identical plane passing through a specimen; an incidence step of causing planar excitation light having a different focal position for each of the plurality of directions to be incident on the specimen along the direction selected in the selection step; a detection step of detecting fluorescence that is generated in the specimen in a detection direction intersecting the plane when the excitation light is made incident in the incidence step to acquire a fluorescence image; and a combination step of combining a plurality of the fluorescence images acquired by sequentially switching the direction selected in the selection step and repeating the incidence step and the detection step, wherein the direction selected in the selection step when the plurality of fluorescence images combined in a series of the combination steps are to be acquired is switched in such an order that the excitation light is made incident starting from a direction equal to an identical direction between before and after each of the combination steps.

According to this aspect, in the incidence step, the planar excitation light from the one direction selected in the selection step is incident on the specimen along the plane passing through the specimen. In the detection step, the fluorescence generated on the incidence plane is detected in the detection direction intersecting the incidence plane of the excitation light, thereby acquiring a fluorescence image. By sequentially switching the incidence direction selected in the selection step and repeating the incidence step and detection step, a plurality of fluorescence images focused on different regions of the specimen can be acquired. Then, one set of fluorescence images acquired by sequentially switching between the incidence directions of the excitation light are combined in the image processing section. Thereafter, the next set of fluorescence images are acquired by sequentially switching between the incidence directions of the excitation light in an order starting with the same direction employed during the previous image acquisition and then combined into a composite image, thereby reducing the number of times the incidence direction of the excitation light is switched and therefore allowing fluorescence images to be acquired at high speed.

Furthermore, the above-described aspect may include: a movement step of moving the specimen in the detection direction, wherein in the selection step, the incidence direction of the excitation light may be selected in such an order that the excitation light is made incident starting from a direction equal to an identical incidence direction between before and after moving the specimen in the movement step.

With this structure, as a result of the specimen being moved in the detection direction, two-dimensional fluorescence images can be acquired at different position to carry out three-dimensional fluoroscopy of the specimen. In this case, as a result of the incidence direction of the excitation light not being changed in the selection step between before and after the specimen is moved, the number of times the incidence direction of the excitation light is switched is reduced, thereby reducing the time required for switching and hence reducing the time required for acquisition of fluorescence images.

Furthermore, the above-described aspect, may include: a wavelength switching step of switching a wavelength of the excitation light, wherein in the selection step, the incidence direction of the excitation light may be selected in such an order that the excitation light is made incident starting from a direction equal to an identical incidence direction between before and after switching the wavelength in the wavelength switching step.

With this structure, by switching the wavelengths of the excitation light in the wavelength switching step, fluoroscopy with different wavelengths can be carried out. In this case, although fluorescence images are acquired by causing the excitation light to be incident along a plurality of incidence directions for each wavelength, the number of times the incidence direction of the excitation light is switched is reduced as a result of the incidence direction of the excitation light not being changed between before and after the wavelength is switched, thereby reducing the time required for switching and hence reducing the time required for acquisition of fluorescence images.

REFERENCE SIGNS LIST 1, 101, 201 Microscope
3, 103, 203 Light source unit (light-sheet illumination optical system)
4, 104, 204 Control section
7 Detection optical system
10 Imaging device
14 Galvanometer mirror (scanning section)
15, 113a, 113b, 214a, 214b Cylindrical lens (excitation-light-forming optical system)
20, 120, 219 Image processing section
123, 216 Shutter (illumination-direction switching section)
S Specimen

The invention claimed is:

1. A microscope comprising:
a detection optical system that detects fluorescence emitted from a specimen to acquire a fluorescence image;
a light-sheet illumination optical system that causes planar excitation light to be incident along a direction intersecting an optical axis of the detection optical system; and
an image processing section that processes the fluorescence image acquired by the detection optical system, wherein:
the light-sheet illumination optical system moves a focal position of the excitation light along an incidence direction thereof,
the image processing section combines a plurality of fluorescence images that are acquired by the detection optical system, each of the plurality of fluorescence images being acquired with the excitation light being made incident on a different focal position by the light-sheet illumination optical system, to generate a composite image, and
the image processing section, in combining the plurality of the fluorescence images, compares luminance values or contrast values of corresponding pixels in the fluorescence images and selects a pixel having a maximum luminance value or a maximum contrast value.

2. The microscope according to claim 1, wherein the light-sheet illumination optical system can set a movement start position, a number of movement steps, and a displacement of each movement step for the focal position of the excitation light.

3. The microscope according to claim 2, wherein the light-sheet illumination optical system can switch a wavelength of the excitation light and can set the movement start position and the displacement for each wavelength of the excitation light.

4. The microscope according to claim 1, wherein the light-sheet illumination optical system can cause the excitation light to be incident alternately from two or more different directions from outside the specimen.

5. The microscope according to claim 4, wherein the light-sheet illumination optical system can cause the excitation light to be incident from opposite sides with respect to the optical axis of the detection optical system.

6. The microscope according to claim 1, further comprising a control section that, when a magnification of the detection optical system is raised, controls the light-sheet illumination optical system so as to reduce a radiation width of the excitation light to be made incident on the specimen by the light-sheet illumination optical system.

7. The microscope according to claim 6, wherein the light-sheet illumination optical system includes:
an excitation-light-forming optical system that forms the planar excitation light, the planar excitation light having a predetermined width; and
a scanning section that scans the planar excitation light formed by the excitation-light-forming optical system in a width direction of the planar excitation light, and wherein the control section controls a swivel angle of the scanning section.

8. The microscope according to claim 4, wherein the light-sheet illumination optical system includes:

an illumination-direction switching section that alternately switches the incidence direction between two or more different directions from outside the specimen to sequentially cause the excitation light to be incident along a plane intersecting the optical axis of the detection optical system, wherein the image processing section combines the plurality of fluorescence images that are acquired by the detection optical system, each of the plurality of fluorescence images being acquired with the excitation light being made incident along one of the two or more different directions, and wherein the light-sheet illumination optical system switches the incidence direction of the excitation light in such an order that the excitation light is made incident starting from a same direction as a last direction that the excitation light was made incident in a most recent combining processing by the image processing section.

9. The microscope according to claim 4, further comprising:

an illumination-direction switching section that alternately switches the incidence direction between two or more different directions from outside the specimen to sequentially cause the planar excitation light to be incident along a plane intersecting the optical axis of the detection optical system;

a movement mechanism that moves the specimen in an optical-axis direction of the detection optical system; and a control section that controls the illumination-direction switching section and the movement mechanism, wherein the image processing section combines the plurality of fluorescence images that are acquired by the detection optical system, each of the plurality of fluorescence images being acquired with the excitation light being made incident along one of the two or more different directions, and wherein when fluorescence images based on the planar excitation light that is made incident along each of the two or more different directions are acquired for one position in the optical-axis direction, the control section controls the movement mechanism so as to move the specimen to a different position in the optical-axis direction and controls the illumination-direction switching section so as to switch the incidence direction of the excitation light in such an order that the excitation light is made incident starting from a same direction as a last direction that the excitation light was made incident before movement of the specimen by the movement mechanism.

\* \* \* \* \*